(12) United States Patent
Schliwa-Bertling et al.

(10) Patent No.: US 9,398,634 B2
(45) Date of Patent: *Jul. 19, 2016

(54) MOBILE STATION, CORE NETWORK NODE, BASE STATION SUBSYSTEM, AND METHODS FOR IMPLEMENTING LONGER PAGING CYCLES IN A CELLULAR NETWORK

(71) Applicant: TELEFONAKTIEBOLAGET L M ERICSSON (PUBL), Stockholm (SE)

(72) Inventors: Paul Schliwa-Bertling, Ljungsbro (SE); Mårten Sundberg, Årsta (SE); Sajal Kumar Das, Bangalore (IN); Ravitej Ballakur, Bangalore (IN); John Walter Diachina, Garner, NC (US); Nicklas Johansson, Brokind (SE); Mats Samuelsson, Stocksund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,157

(22) Filed: Feb. 24, 2015

(65) Prior Publication Data

US 2015/0173122 A1   Jun. 18, 2015

Related U.S. Application Data

(63) Continuation-in-part of application No. 14/464,554, filed on Aug. 20, 2014.

(60) Provisional application No. 61/888,310, filed on Oct. 8, 2013, provisional application No. 62/021,967, filed on Jul. 8, 2014.

(51) Int. Cl.
*H04W 68/00* (2009.01)
*H04W 76/04* (2009.01)
(Continued)

(52) U.S. Cl.
CPC ........ *H04W 76/048* (2013.01); *H04W 36/0044* (2013.01); *H04W 52/0216* (2013.01);
(Continued)

(58) Field of Classification Search
CPC ................... H04W 52/0225; H04W 52/0229; H04W 56/001; H04W 68/02; H04W 76/048; H04W 48/16; H04W 68/00; H04W 68/025; H04W 52/02; H04W 68/12
USPC ........................................................ 455/458
See application file for complete search history.

(56) References Cited

U.S. PATENT DOCUMENTS 8,260,328 B1    9/2012  Yellin et al.
8,457,112 B2 *  6/2013  Krishnamurthy et al. .... 370/352
(Continued)

FOREIGN PATENT DOCUMENTS

EP    2 574 135 A1    3/2013
EP    2 677 818 A1    12/2013
(Continued)

OTHER PUBLICATIONS

Bontu, "DRX mechanism for power saving in LTE" IEEE Communications Magazine, Year: 2009, vol. 47, Issue: 6 pp. 48-55.*
(Continued)

*Primary Examiner* — Juan A Torres

(57) ABSTRACT

A mobile station, a core network node, a base station subsystem, and various methods are described herein for implementing longer paging cycles (longer Discontinuous Reception (DRX) mode) in a cellular network which has a benefit of reducing the energy consumption of the mobile station's battery.

12 Claims, 15 Drawing Sheets

(51) Int. Cl.
*H04W 56/00* (2009.01)
*H04W 52/02* (2009.01)
*H04W 36/00* (2009.01)
*H04W 68/02* (2009.01)
*H04W 48/16* (2009.01)

(52) U.S. Cl.
CPC .......... *H04W52/0235* (2013.01); *H04W 56/00* (2013.01); *H04W 56/001* (2013.01); *H04W 68/02* (2013.01); *H04W 48/16* (2013.01); *H04W 68/00* (2013.01); *Y02B 60/50* (2013.01)

(56) References Cited

U.S. PATENT DOCUMENTS

| | | | | |
|---|---|---|---|---|
| 2007/0224992 | A1* | 9/2007 | Dalsgaard et al. | 455/436 |
| 2007/0291673 | A1* | 12/2007 | Demirhan et al. | 370/311 |
| 2008/0186892 | A1* | 8/2008 | Damnjanovic | 370/311 |
| 2008/0225772 | A1* | 9/2008 | Xu | 370/313 |
| 2009/0232054 | A1* | 9/2009 | Wang et al. | 370/328 |
| 2009/0262648 | A1* | 10/2009 | Chun et al. | 370/241 |
| 2010/0130237 | A1* | 5/2010 | Kitazoe et al. | 455/458 |
| 2010/0184458 | A1* | 7/2010 | Fodor et al. | 455/522 |
| 2011/0038348 | A1* | 2/2011 | Borsella et al. | 370/331 |
| 2011/0075558 | A1* | 3/2011 | Isaksson et al. | 370/230.1 |
| 2011/0195709 | A1 | 8/2011 | Christensson et al. | |
| 2012/0188997 | A1 | 7/2012 | Zakrzewski et al. | |
| 2013/0070589 | A1* | 3/2013 | Diachina et al. | 370/230 |
| 2013/0070699 | A1* | 3/2013 | Diachina et al. | 370/329 |
| 2013/0229931 | A1* | 9/2013 | Kim | 370/252 |
| 2013/0235855 | A1* | 9/2013 | Diachina et al. | 370/336 |
| 2013/0242975 | A1* | 9/2013 | Krishnamurthy et al. | 370/350 |
| 2013/0301501 | A1 | 11/2013 | Olvera-Hernandez et al. | |
| 2014/0064160 | A1* | 3/2014 | Verger et al. | 370/311 |
| 2014/0112221 | A1* | 4/2014 | Verger et al. | 370/311 |
| 2014/0198699 | A1* | 7/2014 | Makharia et al. | 370/311 |
| 2014/0226647 | A1 | 8/2014 | Das et al. | |
| 2014/0321381 | A1 | 10/2014 | Guo et al. | |
| 2014/0362754 | A1* | 12/2014 | Moses et al. | 370/311 |
| 2015/0003311 | A1* | 1/2015 | Feuersaenger et al. | 370/311 |

FOREIGN PATENT DOCUMENTS

| | | |
|---|---|---|
| GB | 2 402 301 A | 12/2004 |
| WO | WO 2012/111483 A1 | 8/2012 |
| WO | WO 2012/173545 A1 | 12/2012 |
| WO | WO 2013/091505 A1 | 6/2013 |

OTHER PUBLICATIONS

Andreev, "Analysis of second UE DRX cycle for enhanced Cell FACH 3GPP UTRAN," 2012 4th International Congress on Ultra Modern Telecommunications and Control Systems and Workshops (ICUMT), Year: 2012 pp. 7-11.*
Jha, "Adaptive DRX configuration to optimize device power saving and latency of mobile applications over LTE advanced network" 2013 IEEE International Conference on Communications (ICC), Jun. 9-13, 2013, pp. 6210-6214.*
Lei Zhou, "Performance Analysis of Power Saving Mechanism with Adjustable DRX Cycles in 3GPP LTE" IEEE 68th Vehicular Technology Conference, 2008, VTC 2008 Fall, Year: 2008, pp. 1-5.*
Jie Song, "Power savings for cell search application with DRX feature in LTE" 2012 9th International Conference on Fuzzy Systems and Knowledge Discovery (FSKD), Year: 2012, pp. 2953-2956.*
Sunggeun Jin , "Numerical Analysis of the Power Saving in 3GPP LTE Advanced Wireless Networks," IEEE Transactions on Vehicular Technology, Year: 2012, vol. 61, Issue: 4, pp. 1779-1785.*
3GPP TSG GERAN #58, "Longer Paging Cycles for the MTC use case", Agenda Item: 7.2.5.3.6, Tdoc: GP-130473, Source: Telefon AB LM Ericsson, ST-Ericsson, Xiamen, P.R. China, May 13-17, 2013, the whole document.
3GPP TSG GERAN / WG2, TSGG#57(13)0093, "LS on requesting input on MTCe solutions", Vienna, Austria, Feb. 25-Mar. 1, 2013, the whole document.
3GPP TSG GERAN / WG2, TSGG#57(13)0249, "Reply LS on requesting input on MTCe solutions", Vienna, Austria, Feb. 25-Mar. 1, 2013, the whole document.
3GPP TS 44.018 V11.3.0 (Nov. 2012), 3rd Generation Partnership Project; Technical Specification Group GSM/EDGE Radio Access Network; Mobile radio interface layer 3 specification; Radio Resource Control (RRC) protocol (Release 11), SP-57, GP-56, available Jan. 1, 2013, the whole document.
3GPP TS 45.008 V11.4.0 (May 2013), 3rd Generation Partnership Project; Technical Specification Group GSM/EDGE Radio Access Network; Radio subsystem link control (Release 11), SP-57, GP-58, version 11.4.0, the whole document.
3GPP TS 45.002 V11.2.0 (Mar. 2013), 3rd Generation Partnership Project; Technical Specification Group GSM/EDGE Radio Access Network; Multiplexing and multiple access on the radio path (Release 11), SP-57, GP-57, available Mar. 15, 2013, the whole document.
3GPP TSG GERAN #59, "A Solution to Long Paging cycles for MTC Devices", Source: Telefon AB LM Ericsson, ST-Ericsson, Tdoc: GP-130730, Agenda Item: 7.2.5.3.6,7.1.5.2.5, Sofia, Bulgaria, Aug. 26-30, 2013, the whole document.
3GPP TS 45.002 V12.1.0 (Nov. 2013), 3rd Generation Partnership Project; Technical Specification Group GSM/EDGE Radio Access Network; Multiplexing and multiple access on the radio path (Release 12), GP-60, version 12.1.0, available Dec. 19, 2013, the whole document.
P.J. Kootsookos: "A Review of the Frequency Estimation and Tracking Problems", CRC for Robust and Adaptive Systems DSTO, Salisbury Site Frequency Estimation and Tracking Project, Feb. 21, 1999, the whole document.
Das S.: "Mobile Handset Design", Wiley, 2010, section 10.8.3, pp. 326-327.
3GPP TR 21.905 V12.0.0 (Jun. 2013), 3rd Generation Partnership Project; Technical Specification Group Services and System Aspects; Vocabulary for 3GPP Specifications (Release 12), SP-60, version 12.0.0, available Jun. 25, 2013, the whole document.
3GPP TS 41.102 V4.8.0 (Mar. 2003), 3rd Generation Partnership Project; Technical Specification Group Services and System Aspects; GSM Release 4 specifications (Release 4), SP-19, version 4.8.0, available Mar. 27, 2003, the whole document.
GP-131136 (Rev of GP-131108), 3GPP TSG GERAN #60, Agenda item: 7.2.5.3.7, 7.1.5.3.5, China Mobile Communication Corporation, Zhuhai, P.R.China, Nov. 18-22, 2013, the whole document.
3GPP TS 23.682 V12.1.0 (Mar. 2014), 3rd Generation Partnership Project; Technical Specification Group Services and System Aspects; Architecture enhancements to facilitate communications with packet data networks and applications (Release 12), SP-63, version 12.1.0, available Mar. 10, 2014, the whole document.
GP-131045, "A solution to long paging cycles for MTC devices" (Update of GP-130973), 3GPP TSG GERAN#60, Agenda item 7.1.5.4, 7.2.5.3.7, Source: Telefon AB LM Ericsson, Zhuhai, P.R. China, Nov.18-22, 2013, the whole document.

* cited by examiner

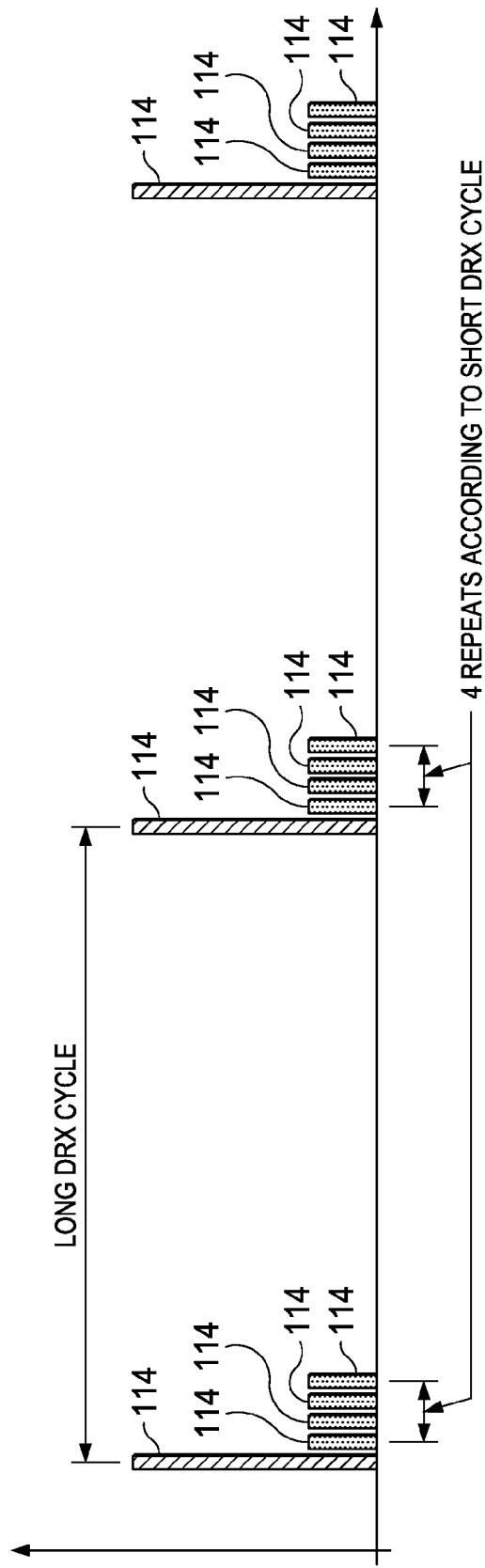

MOBILE STATION, CORE NETWORK NODE, BASE STATION SUBSYSTEM, AND METHODS FOR IMPLEMENTING LONGER PAGING CYCLES IN A CELLULAR NETWORK

CLAIM OF PRIORITY

This application is a continuation-in-part of U.S. patent application Ser. No. 14/464,554 filed on Aug. 20, 2014, which claims priority to Indian Application No. 2484/DEL/2013 filed on Aug. 22, 2013 and which claims the benefit of U.S. Provisional Application Ser. No. 61/888,310 filed on Oct. 8, 2013. This application also claims priority to Indian Application No. 1349/DEL/2014 filed on May 22, 2014 and claims the benefit of U.S. Provisional Application Serial No. 62/021,967 filed on Jul. 8, 2014. The entire contents of each of these applications are hereby incorporated by reference for all purposes.

TECHNICAL FIELD

The present invention relates to a mobile station, a core network node, a base station subsystem, and various methods for implementing longer paging cycles within a cellular network.

BACKGROUND

The following abbreviations are herewith defined, at least some of which are referred to within the following description of the prior art and the present invention.
AFC Automatic Frequency Control
ATC Automatic Time Control
BA BCCH Allocation
BCCH Broadcast Control Channel
BS-PA-MFRMS Base Station Paging Multiframes
BSIC Base Station Identification Code
CCCH Common Control Channel
CRC Cyclic Redundancy Check
DRX Discontinuous Reception
E-UTRA Evolved Universal Terrestrial Radio Access
FCCH Frequency Correction Channel
FDMA Frequency Division Multiple Access
GSM Global System for Mobile Communications
HLR Home Location Register
LA Location Area
MS Mobile Station
MTC Machine Type Communication
NAS Non Access Stratum
NB Normal Burst
RACH Random Access Channel
RA Routing Area
RF Radio Frequency
RR Radio Resources
RSSI Received Signal Strength Indicator
SB Synchronization Burst
SCH Synchronization Channel
SIM GSM Subscriber Identity Module
TBF Temporary Block Flow
TDMA Time Division Multiple Access
TSC Training Sequence Code
UTRA Universal Terrestrial Radio Access In a Global System for Mobile Communications (GSM) network today, each registered mobile station (MS) must monitor its own paging group on the paging channel periodically with a periodicity which varies between 0.47 and 2.12 seconds and is set by the parameter BS-PA-MFRMS (see 3GPP TS 44.018 V11.3.0 (2012-11)'s chapter 10.5.2.11—the contents of which are incorporated by reference herein). The length of the paging cycle is set to achieve a balance between the acceptable responsiveness for mobile terminated call set-up procedures and the MS battery lifetime. Today, the MS uses a significant amount of power decoding and processing received information which is not intended for it when it periodically checks for incoming paging messages and performs other idle mode activities. This leads to significant overhead which quickly drains the MS battery especially for MSs which are characterized as machine type communication (MTC) devices.

SUMMARY

A mobile station, a core network node, a base station subsystem, and various methods for implementing paging cycles in a cellular network to address problems with existing systems are described in the present application. Advantageous embodiments of the mobile station, the core network node, the base station subsystem, and various methods are further described in the present application.

In one aspect, a mobile station is configured to implement paging cycles in a cellular network. The mobile station comprising at least one processor, and at least one memory that stores processor-executable instructions, wherein the at least one processor interfaces with the at least one memory to execute the processor-executable instructions, whereby the mobile station is operable to determine if a serving cell in the cellular network is acceptable to stay camped-on. If the result of the determination is that the serving cell is acceptable to stay camped-on, then the mobile station is operable to perform a first type of synchronizing procedure (short sync up procedure) and attempt to read a radio block (e.g., paging block, CCCH block, paging message, paging notification) received per a first DRX mode, wherein the first DRX mode has a longer time period than a legacy second DRX mode. If the result of the determination is that the serving cell is not acceptable to stay camped-on or the mobile station is not able to read the received radio block during the first type of synchronizing procedure, then the mobile station is operable to perform a second type of synchronizing procedure (long sync up procedure) and attempt to read another radio block, wherein the first type of synchronizing procedure has a shorter duration than the second type of synchronizing procedure. The mobile station operating in this manner has the advantage of reducing the energy consumption of the mobile station's battery, as compared to a mobile station operating under a legacy paging cycle.

In another aspect, a method in a mobile station is for implementing paging cycles in a cellular network. The method comprises the mobile station determining if a serving cell in the cellular network is acceptable to stay camped-on. If the result of the determination is that the serving cell is acceptable to stay camped-on, then the mobile station performs a first type of synchronizing procedure (short sync up procedure) and attempts to read a radio block (e.g., paging block, CCCH block, paging message, paging notification) received per a first DRX mode, wherein the first DRX mode has a longer time period than a legacy second DRX mode. If the result of the determination is that the serving cell is not acceptable to stay camped-on or the mobile station is not able to read the received radio block during the first type of synchronizing procedure, then the mobile station performs a second type of synchronizing procedure (long sync up procedure) and attempts to read another radio block, wherein the first type of synchronizing procedure has a shorter duration than the second type of synchronizing procedure. The method has the advantage of reducing the energy consumption of the mobile station's battery since it is expected that for a large majority of the time, a mobile station will be able to determine that the serving cell is acceptable to stay camped-on and will be able to successfully read a radio block during the short sync up procedure.

In still another aspect, a base station subsystem (BSS) is configured to implement paging cycles for a mobile station in a cellular network. The BSS comprising at least one processor, and at least one memory that stores processor-executable instructions, wherein the at least one processor interfaces with the at least one memory to execute the processor-executable instructions, whereby the BSS is operable to receive, from a core network node in the cellular network, a message containing information the BSS needs to generate and transmit on a radio interface a radio block (e.g., paging block, CCCH block, paging message, paging notification) for the mobile station. The BSS is also operable to transmit the radio block according to a first DRX mode rather than a legacy second DRX mode in one or more cells of a paging area of the mobile station, wherein the first DRX mode has a longer time period than the legacy second DRX mode. The BSS operating in this manner has the advantage of enabling the possibility of reducing the energy consumption of the mobile station's battery.

In yet another aspect, a method in a BSS is for implementing paging cycles for a mobile station in a cellular network. The method comprises the BSS receiving, from a core network node in the cellular network, a message containing information the BSS needs to generate and transmit on a radio interface a radio block (e.g., paging block, CCCH block, paging message, paging notification) for the mobile station. The BSS also transmits the radio block according to a first DRX mode rather than a legacy second DRX mode in one or more cells of a paging area of the mobile station, wherein the first DRX mode has a longer time period than the legacy second DRX mode. The method has the advantage of enabling the possibility of reducing the energy consumption of the mobile station's battery.

In still yet another aspect, a core network node is configured to implement paging cycles for a mobile station in a cellular network. The core network node comprising at least one processor, and at least one memory that stores processor-executable instructions, wherein the at least one processor interfaces with the at least one memory to execute the processor-executable instructions, whereby the core network node is operable to identify the mobile station as being configured per a first DRX mode rather than a legacy second DRX mode, wherein the first DRX mode has a longer time period than the legacy second DRX mode. The core network node is also operable to receive downlink payload for the mobile station. Upon receipt of the downlink payload, the core network node is operable to transmit to one or more BSSs which manage cells in a paging area of the mobile station a message containing information each BSS needs to generate and transmit on a radio interface a radio block (e.g., paging block, CCCH block, paging message, paging notification) for the mobile station per the first DRX mode. The core network node operating in this manner has the advantage of enabling the possibility of reducing the energy consumption of the mobile station's battery.

In yet another aspect, a method in a core network node is for implementing paging cycles for a mobile station in a cellular network. The method comprises the core network node identifying the mobile station as being configured per a first DRX mode rather than a legacy second DRX mode, wherein the first DRX mode has a longer time period than the legacy second DRX mode. The core network node also receives downlink payload for the mobile station. Upon receipt of the downlink payload, the core network node transmits to one or more BSSs which manage cells in a paging area of the mobile station a message containing information each BSS needs to generate and transmit on a radio interface a radio block (e.g., paging block, CCCH block, paging message, paging notification) to the mobile station per the first DRX mode. The method has the advantage of enabling the possibility of reducing the energy consumption of the mobile station's battery.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 7A-7D are various diagrams illustrating how the mobile station (e.g., MTC) can implement paging cycles that are longer than in the past in accordance with different embodiments of the present invention;

DETAILED DESCRIPTION

The existing 3GPP specification assumes that the requirement for reachability of each MS is time critical, i.e., communication has to be initiated as soon as possible after initial reception of an incoming paging message (paging block) within the core network. This means that each MS must spend a significant amount of energy on decoding information not intended for it when periodically checking for an incoming page each time its paging block occurs. This prevents a prolonged sleep mode in the MS. For less time critical applications, e.g., for certain types of machine type communication (MTC) applications, this time critical reachability might be unnecessary as a significant percentage of these types of applications are not expected to be especially time critical with regards to the downlink communication mechanism being used for payload delivery because the payload itself is not very time critical. Hence, if the paging group monitoring is performed more infrequently by specific types of MSs (e.g., MTC devices) that require less time critical communication, then less energy would be consumed by these MSs in these cases. The present application addresses the problem of excessive power consumption by these specific types of MSs in which battery power is a major bottleneck for their operation (e.g., they may not have access to external power) due to the unnecessary time critical management of downlink communication (i.e., paging group monitoring) by not requiring a time critical paging mechanism for cases where the fast delivery of downlink payload is not necessary. In other words, the disclosed techniques reduce energy consumption of these specific types of MSs while in idle mode, which leads to a significant decrease in the rate that the battery power in the MSs is drained. A detailed discussion regarding these techniques in various embodiments is provided below with respect to FIGS. 1-8.

Figure 1:
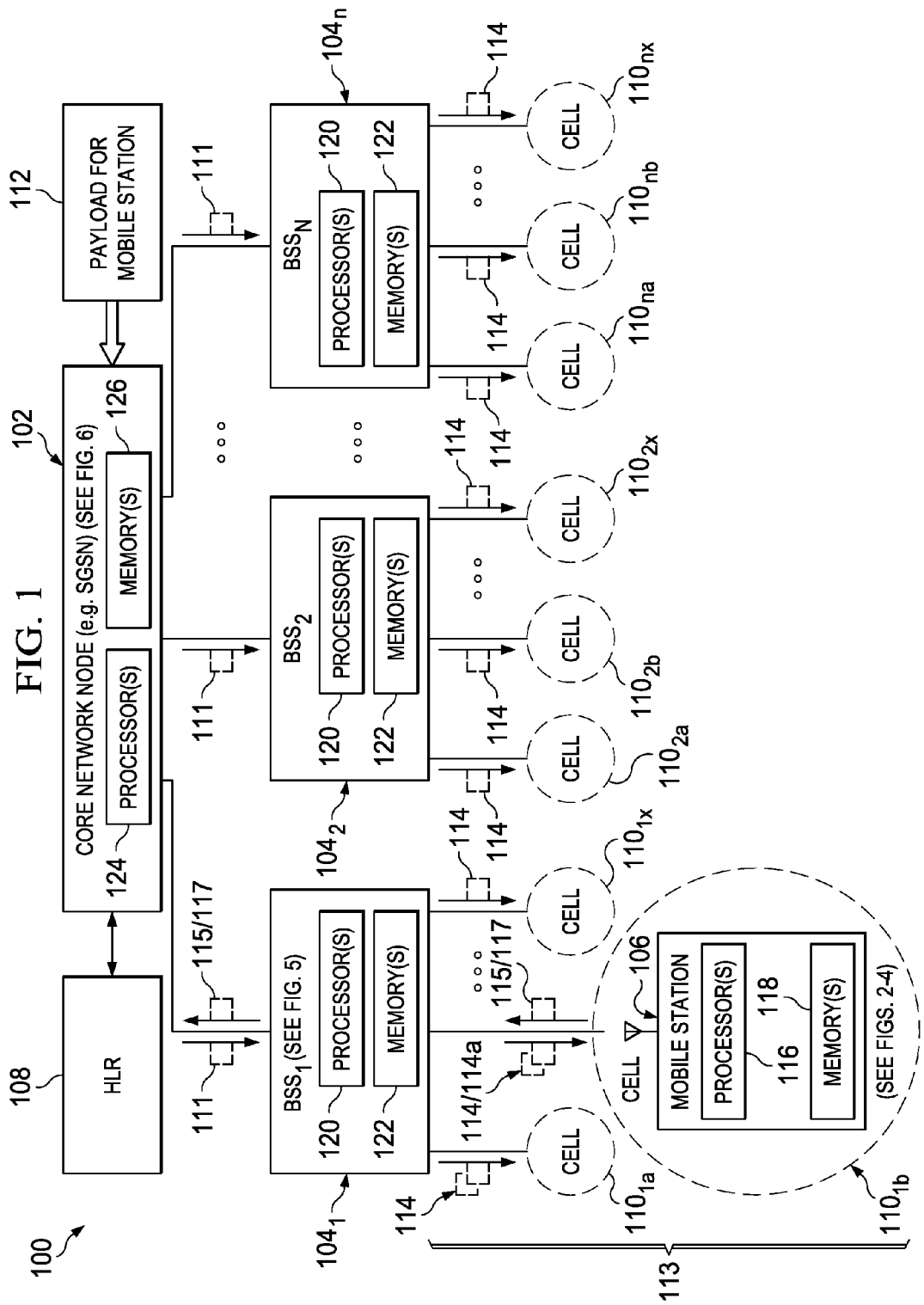
FIG. 1 is a diagram of an exemplary cellular network which is used to help describe how a core network node (e.g., SGSN), multiple BSSs, and a mobile station (e.g., MTC device) are configured to implement paging cycles which are longer than in the past in accordance with different embodiments of the present invention.

Referring to FIG. 1, there is a diagram of an exemplary cellular network 100 which is used to help describe how a core network node 102 (e.g., SGSN 102), multiple BSSs $104_1, 104_2 \ldots 104_n$, and a mobile station 106 are configured to implement paging cycles with a longer duration than in the past in accordance with different embodiments of the present invention. The exemplary cellular network 100 comprises at least the core network node 102 (e.g., SGSN 102) which interfaces with a HLR 108 and the multiple BSSs $104_1$, $104_2 \ldots 104_n$. In this example, the BSS $104_1$ manages cells $110_{1a}, 110_{1b} \ldots 110_{1x}$. The BSS $104_2$ manages cells $110_{2a}$, $110_{2b} \ldots 110_{2x}$. The BSS $104_n$ manages cells $110_{na}$, $110_{nb} \ldots 110_{nx}$. In this example, only one mobile station 106 has been shown which is located in cell $110_{1b}$ and is being serviced by BSS $104_1$. However, it should be appreciated that any number of mobile stations 106 can be supported and can be located in one or more of the cells $110_{1a}, 110_{1b} \ldots 110_{1x}$, $110_{2a}, 110_{2b} \ldots 110_{2x}$, and $110_{na}, 110_{nb} \ldots 110_{nx}$). Further, it should be appreciated that the cellular network 100, the core network node 102 (e.g., SGSN 102), the BSSs $104_1, 104_2 \ldots 104_n$, the mobile station 106 etc. . . . all contain components and have functionalities which are well known in the field, but for clarity, only those components and functionalities which are needed to explain and enable the disclosed techniques which have been described herein. A detailed discussion regarding the basic concepts of the disclosed novel techniques is provided next and then a detailed discussion is provided with respect to FIGS. 2-8 to explain how the mobile station 106, the BSSs $104_1, 104_2 \ldots 104_n$, and the core network node 102 (e.g., the SGSN 102) are configured to implement paging cycles which have a longer duration than in the past in accordance with possible different embodiments.

In regards to the basic concept, a longer paging cycle (long DRX mode) is introduced for MSs 106 (e.g., MTC devices 106) which are used for less time critical communications to primarily save the battery power of those MSs 106. These MSs 106 would be identified by the core network node 102 at registration (e.g., based on information included in registration related NAS signaling or based on subscription information maintained by the HLR 108), such that the core network node 102 is aware of the device type and the presently set DRX period (i.e., paging cycle) for those MSs 106. Further, the core network node 102 takes appropriate actions whenever downlink payload 112 becomes available for a specific one of these MSs 106 and transmits to the set of BSSs $104_1$, $104_2 \ldots 104_n$, which are managing cells $110_{1a}, 110_{1b}, \ldots$ $110_{1x}, 110_{2a}, 110_{2b} \ldots 110_{2x}$, and $110_{na}, 110_{nb} \ldots 110_{nx}$ in the applicable paging area 113 for the specific MS 106, a message 111 containing information needed by the BSSs $104_1$, $104_2 \ldots 104_n$ to generate and transmit on a radio interface a radio block 114 (e.g., paging block 114, paging message 114, paging notification 114, CCCH block 114) for the mobile station 106.

The MS 106, while in idle mode, wakes periodically and performs the necessary tasks specific for idle mode including checking for receipt of the radio block 114 and then returns to sleep mode. In the sleep mode, the MS 106 cuts the clock to most of its modules and thereby operates in a power saving mode. The longer the sleeping period, the more the power is saved. Hence, to maximize the power saved by the MS 106 during the power saving mode, the preferred option would be to prolong the sleep duration (e.g., increase the time between consecutive instances of waking up to perform the idle mode tasks). The disclosed techniques perform this functionality.

To appreciate the benefits of the present invention, one should realize that the traditional MS once it has camped to a suitable serving cell would perform the following steps:
(1) Read BCCH information for BA list: MS reads BCCH to get neighbor cell list.
(2) Make RSSI measurements for the neighbor cells identified using step (1).
(3) BSIC Identification: read FCCH and SCH of the cells in the cell data base (neighbor+serving) to identify the cell-ID. If a new cell is found, it is added to the cell data base for periodic monitoring.
(4) BSIC reconfirmation: re-confirms cell-ID of the already detected neighbor and serving cells by reading SCH.
(5) Cell reselection: camp to the best detected neighbor cell
(6) LA/RA update: perform NAS procedures for updating the LA and RA as needed.
(7) AFC: does the frequency correction of the local clock.

All these tasks put a significant burden on the traditional MS in idle mode that leads to significant power consumption in order to keep the traditional MS synchronized with the network for receiving paging messages in a time critical manner. The present disclosed techniques reduce this overhead by eliminating the execution of the above tasks on a periodic basis and instead having the MS 106 executing them on an as needed basis. In particular, this overhead is reduced by configuring the MS 106 such that, while it is in idle mode, there is no periodic RSSI measurement, no background neighbor cell search, no BA list reading (e.g., no BCCH reading every 30 seconds), and no SCH reading for BSIC reconfirmation every 30 seconds. Instead, the MS 106 is configured to implement the procedure as described in detail below with respect to FIGS. 2-4 and 7-8.

Figure 2:
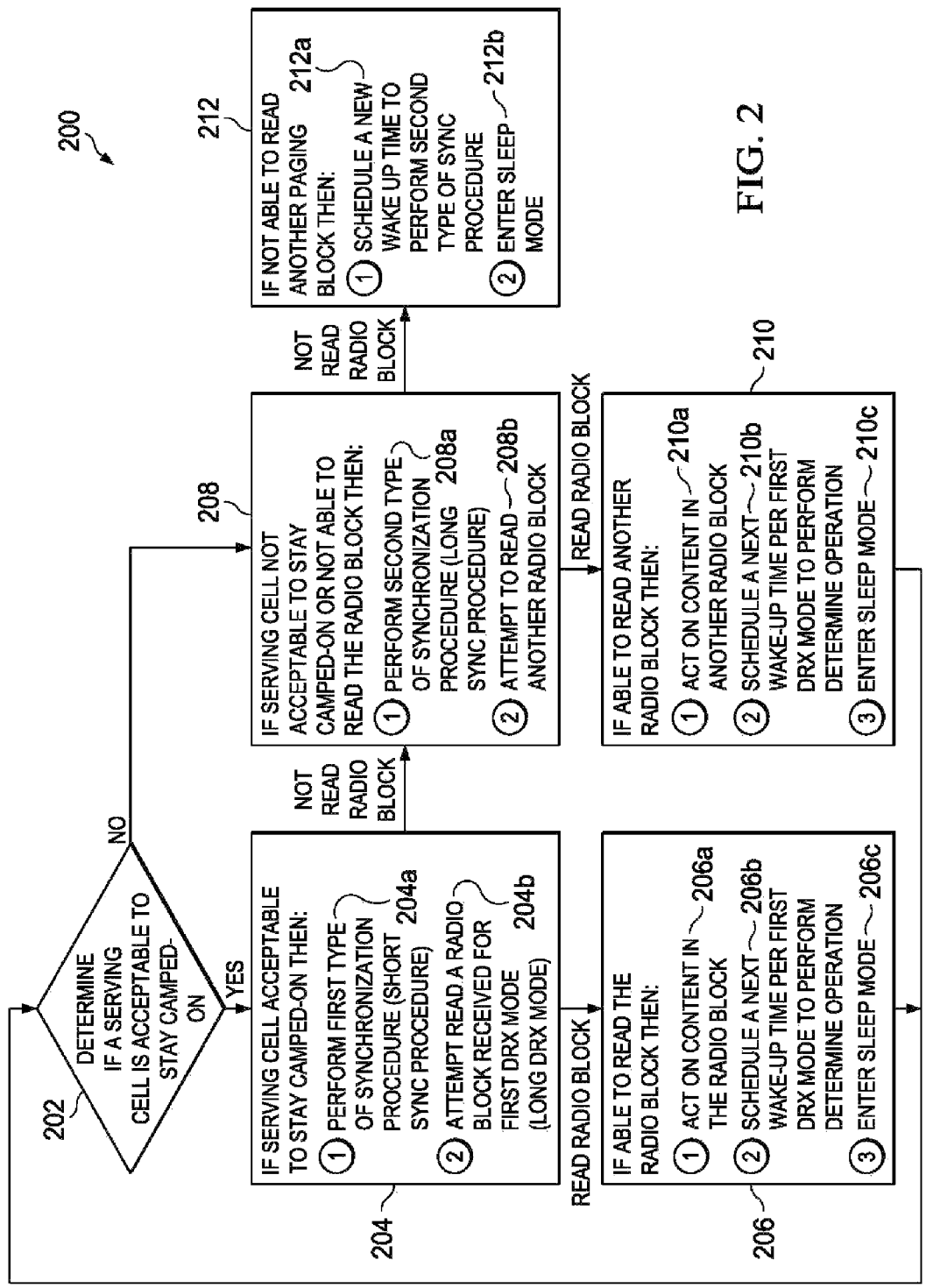
FIG. 2 is a flow chart of a method in the mobile station (e.g., MTC device) for implementing paging cycles which are longer than in the past in accordance with the present invention.

Referring to FIG. 2, there is a flow chart of a method 200 in the mobile station 106 (e.g., MTC device 106) for implementing paging cycles with a longer duration than in the past in accordance with the disclosed techniques. The mobile station 106 comprises at least one processor 116 and at least one memory 118 that stores processor-executable instructions, wherein the at least one processor 116 interfaces with the at least one memory 118 to execute the processor-executable instructions such that the mobile station 106 is operable at step 202 to determine if a serving cell 110$_{1b}$ (for example) is acceptable to stay camped-on. Further discussion is provided below on different ways that the mobile station 106 can perform step 202. If the mobile station 106 determines that the serving cell 110$_{1b}$ is acceptable to stay camped-on, then at step 204, the mobile station 106 performs (step 204a) a first type of synchronizing procedure (i.e., short synchronizing procedure) and then attempts (step 204b) to read a radio block 114 (e.g., paging block 114, CCCH block 114, paging message 114, paging notification 114) received per a first DRX mode (i.e., long DRX mode). It is to be noted that the first DRX mode has a longer time period than a legacy second DRX mode, and that the mobile station 106 will attempt to read the radio block 114 (e.g., CCCH block 114) only if the mobile station 106 successfully performed the first type of synchronizing procedure. If the mobile station 106 is able to read the received radio block 114, then at step 206, the mobile station 106 then (1) performs an action (step 206a) based on content in the received radio block 114, (2) schedules (step 206b) a next wake-up time based on the first DRX mode (i.e., long DRX mode) to perform the determination of step 202, and then (3) enters (step 206c) sleep mode. If the mobile station 106 determines that the serving cell 110$_{1b}$ is not acceptable to stay camped-on during step 202 or if the mobile station 106 is not able to read the received radio block 114 during step 204b, the mobile station 106 schedules a next wake-up time based on the first DRX mode (i.e., long DRX mode) (not illustrated) then proceeds to step 208, wherein the mobile station 106 performs (step 208a) a second type of synchronizing procedure (i.e., long synchronizing procedure) and attempts (step 208b) to read another radio block 114a (e.g., another CCCH block 114a). In some embodiments, as described with reference to FIGS. 8A-8C, the mobile station 106 performs other operations in an attempt to read the radio block 114 before performing the second type of synchronizing procedure (step 208a). In some embodiments, the mobile station 106 may also perform step 208 if the mobile station 106 did not successfully perform the first type of synchronizing procedure (step 204a). If the mobile station 106 is able to read the another received radio block 114a during step 208b, then at step 210, the mobile station 106 then (1) performs an action (step 210a) based on content in the another received radio block 114a, (2) schedules (step 210b) a next wake-up time based on the first DRX mode to perform the determination of step 202, and then (3) enters (step 210c) sleep mode. If the mobile station 106 is not able to read the another received radio block 114a during step 208b, then at step 212, the mobile station 106 (1) schedules (step 212a) a next wake-up time based on the first DRX mode to perform the second type of synchronizing procedure and then (2) enters (step 212b) sleep mode. Detailed descriptions of different exemplary embodiments of method 200 are described next with respect to FIGS. 3-4 and 7-8.

Figure 3:
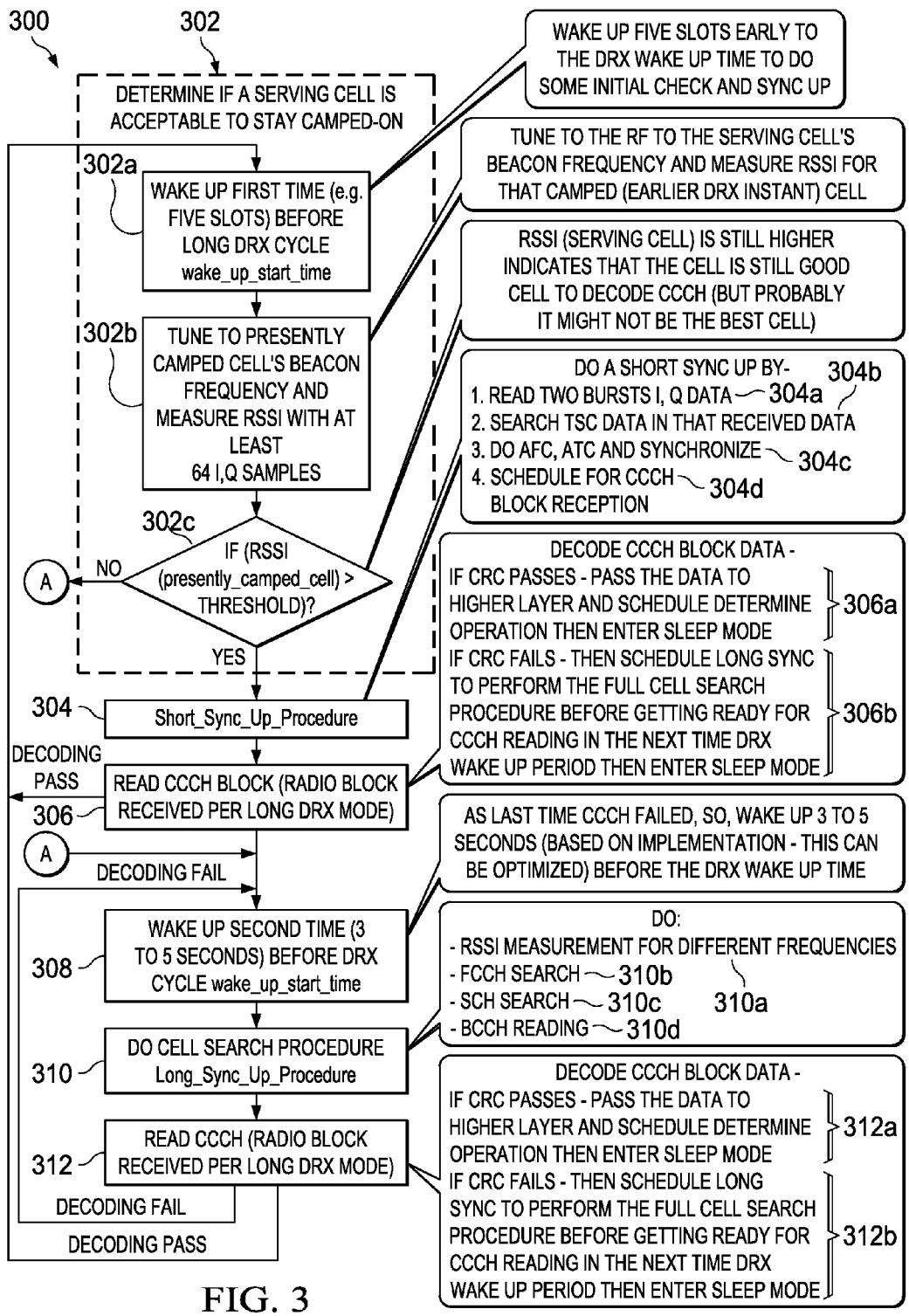
FIG. 3 is a flow chart of a method in the mobile station (e.g., MTC device) for implementing paging cycles with a longer duration than in the past in accordance with an embodiment of the present invention.

Referring to FIG. 3, there is a flow chart of a method 300 in the mobile station 106 (e.g., MTC device 106) for implementing paging cycles with a longer duration than in the past in accordance with an embodiment. The mobile station 106 comprises at least one processor 116 and at least one memory 118 that stores processor-executable instructions, wherein the at least one processor 116 interfaces with the at least one memory 118 to execute the processor-executable instructions such that the mobile station 106 is operable at step 302 to determine if a serving cell 110$_{1b}$ (for example) is acceptable to stay camped-on. For example, the mobile station 106 can perform step 302 as follows: (1) wake-up (step 302a) a predetermined first time (e.g., five slots before DRX cycle wake-up time) before a start time of a paging cycle based on the first DRX mode, which has a longer time period than a legacy second DRX mode; (2) tune (step 302b) to a radio frequency of a beacon channel of the serving cell 110$_{1b}$ and measure a RSSI of the beacon channel from the serving cell 110$_{1b}$; and (3) compare (step 302c) the RSSI to a threshold value. If the RSSI is greater than the threshold value, then the serving cell 110$_{1b}$ is acceptable to stay camped-on. Otherwise, if the RSSI is less than or equal to the threshold value, then the serving cell 110$_{1b}$ is not acceptable to stay camped-on.

If the mobile station 106 determines that the serving cell 110$_{1b}$ is acceptable to stay camped-on, then at step 304, the mobile station 106 performs a first type of synchronizing procedure (i.e., short synchronizing procedure). For example, the mobile station 106 can perform the first type of synchronizing procedure as follows: (1) read (304a) a predetermined number of bursts from a received beacon channel of the serving cell 110$_{1b}$; (2) search (304b) for a Training Sequence Code (TSC) in the read bursts to confirm cell identification of the serving cell 110$_{1b}$; (3) perform (304c) Automatic Frequency Control (AFC) operations and Automatic Time Control (ATC) operations; and (4) schedule (304d) for reception of the radio block 114. After step 304, the mobile station 106 performs step 306 and attempts to read the radio block 114 (e.g., CCCH block 114). It is to be noted that the mobile station 106 will attempt to read the radio block 114 (e.g., CCCH block 114) only if it successfully performed the first type of synchronizing procedure (304). If the mobile station 106 is able to read the received radio block 114 (e.g., able to decode the radio block 114 and CRC passes), then at step 306a, the mobile station 106 then (1) performs an action based on content in the received radio block 114 (e.g., passes the data to a higher layer), (2) schedules a next wake-up time based on the first DRX mode (i.e., long DRX mode) to perform the determination of step 302, and then (3) enters sleep mode. If the mobile station 106 is not able to read the received radio block 114 (e.g., not able to decode the radio block 114 or the CRC does not pass), then at step 306b, the mobile station 106 then schedules the second type of synchronizing procedure (i.e., long synchronizing procedure) to perform the full cell search procedure before getting ready for the radio block reading (i.e., CCCH reading) in the next time DRX wake-up period based on the first DRX mode, and then enters sleep mode.

If the mobile station 106 determines that the serving cell 110$_{1b}$ is not acceptable to stay camped-on during step 302 (FIG. 3's numeral "A" which indicates the connection between step 302c and step 308) or if the mobile station 106 is not able to read the received radio block 114 during step 306, then at step 308, the mobile station 106 wakes-up a predetermined second time (e.g., 3 to 5 seconds before the DRX cycle wake-up time) before a start time of a next paging cycle based on the first DRX mode to perform, at step 310, the second type of synchronizing procedure. It is to be noted that the mobile station 106 may also perform step 310 if the mobile station 106 did not successfully perform the first type of synchronizing procedure (304). For example, the mobile station 106 can perform the second type of synchronizing procedure as follows: (1) perform (step 310a) Received Signal Strength Indicator (RSSI) measurement for different frequencies; (2) perform (step 310b) Frequency Correction Channel (FCCH) search; (3) perform (step 310c) Synchronization Channel (SCH) search; and (4) read (step 310d) Broadcast Control Channel (BCCH) information. After step 310, the mobile station 106 at step 312 attempts to read another radio block 114a (e.g., another CCCH block 114a). If the mobile station 106 is able to read the another received radio block 114a (e.g., decode the radio block 114a and CRC passes), then at step 312a, the mobile station 106 then (1) performs an action based on content in the another received radio block 114a (e.g., passes the data to a higher layer), (2) schedules a next wake-up time based on the first DRX mode to perform the determination of step 302, and then (3) enters sleep mode. If the mobile station 106 is not able to read (e.g., not able to decode the another radio block 114a or the CRC does not pass) the received radio block 114 then proceed to step 312b, wherein the mobile station 106 then schedules the second type of synchronizing procedure (i.e., long synchronizing procedure) to perform the full cell search procedure before getting ready for another radio block reading (e.g., CCCH reading) in the next time DRX wake-up period based on the first DRX mode, and then enters sleep mode. The method 300 is further described next.

Once the long DRX period is set, the mobile station 106 will only wake up, e.g., 5 slots earlier than its nominal long DRX paging block 114 (determined according to the actual long DRX wakeup time) is scheduled to be received from its serving cell $110_{1b}$ (for example) in order to perform some limited initial check and sync up procedures, as illustrated in steps 302 and 302a. The mobile station 106 will thereby verify whether it is already in-sync with the same serving cell $110_{1b}$ the mobile station 106 was camping on when it last successfully performed these limited operations. When the limited operations are performed, the serving cell $110_{1b}$ might not actually be the best cell at that point, but if the mobile station 106 is still synchronized with the serving cell $110_{1b}$, then the mobile station 106 will proceed. The steps corresponding to these limited operations are as below:

(1) Tune to the radio frequency (RF) of the serving cell's beacon frequency and measure RSSI thereon (step 302b).

(2) Compare and determine whether the RSSI of the serving cell $110_{1b}$ is still higher than a threshold or not (step 302c).

(3) If the result of step (2) is yes, that indicates that the mobile station 106 can continue with its current serving cell $110_{1b}$ and perform the following:

a. Perform a short sync up procedure, where the mobile station 106 will search the TSC number in any received normal burst (i.e., to confirm the cell ID has not changed since the last time the mobile station 106 successfully performed the limited set of operations) (steps 304a and 304b), perform the frequency and time correction (step 304c), then schedule the CCCH reading (i.e., the mobile station 106 schedules the reading of its nominal paging block 114 determined according to the long DRX mode) (step 304d).

b. If the CCCH reading 306a is successful (i.e., a valid radio block 114 is read), then the mobile station 106 acts accordingly and goes to sleep again after scheduling its next wakeup according to the long DRX mode wherein the mobile station 106 will wake up a few timeslots (TSs) early (e.g. 5 TSs) to perform the limited initial check and sync up procedures (steps 302 and 304). Else if unsuccessful (i.e., a valid radio block 114 is not read), then the mobile station 106 schedules its next wakeup according to the long DRX mode, but the mobile station 106 will wake up much earlier (e.g., 3 to 5 seconds) before its nominal long DRX paging block 114 is scheduled to be received in order to perform the initial cell search method (i.e., what is normally executed after the mobile station powers ON) (steps 306b, 308 and 310). That means that the mobile station 106 will scan through the frequencies and, according to the measured strongest RSSI (step 310a), detect FCCH and SCH (steps 310b and 310c), and perform the proper (i.e., full) cell selection operations. The mobile station 106 will perform all these steps before its nominal long DRX paging block 114 is scheduled to be received, because the mobile station 106 has awakened 3-5 seconds earlier than its nominal long DRX period. Then, the mobile station 106 schedules the CCCH reading (i.e., paging block 114 reading) and this time there is a high possibility that the CCCH reading will pass (i.e., be successful) (step 312). If the CCCH reading passes, then the mobile station 106 will go to sleep according to the long DRX mode and when it next wakes up, the mobile station 106 will only perform the limited initial check and sync up procedures (steps 302 and 304), else the mobile station 106 will again schedule its next wakeup according to the long DRX mode but the mobile station 106 will wake up much earlier (e.g., 3 to 5 seconds) before its nominal long DRX paging block 114 is scheduled to be received in order to perform the initial cell search method, as illustrated in steps 312b, 308 and 310.

(4) If the result of step (2) is no, that means that the present cell $110_{1b}$ is not suitable for signal reception, in which case the mobile station 106 schedules its next wake-up according to the long DRX mode but will wake up much earlier (e.g., 3 to 5 seconds) before its nominal long DRX paging block 114 is scheduled to be received in order to perform the initial cell search method (i.e., long sync up procedure) as discussed above in step 3b, as illustrated in steps 302, 308, 310 and 312.

As an alternative option, to allow the mobile station 106 to still have a chance to receive a radio block 114 (e.g., paging block 114, CCCH block 114, paging message 114, paging notification 114) the BSS $104_1$ (for example) might have transmitted to the mobile station 106 using the nominal long DRX block if the result of step (2) is no, then the mobile station 106 could operate in a manner that is described next with respect to FIG. 4.

Figure 4:
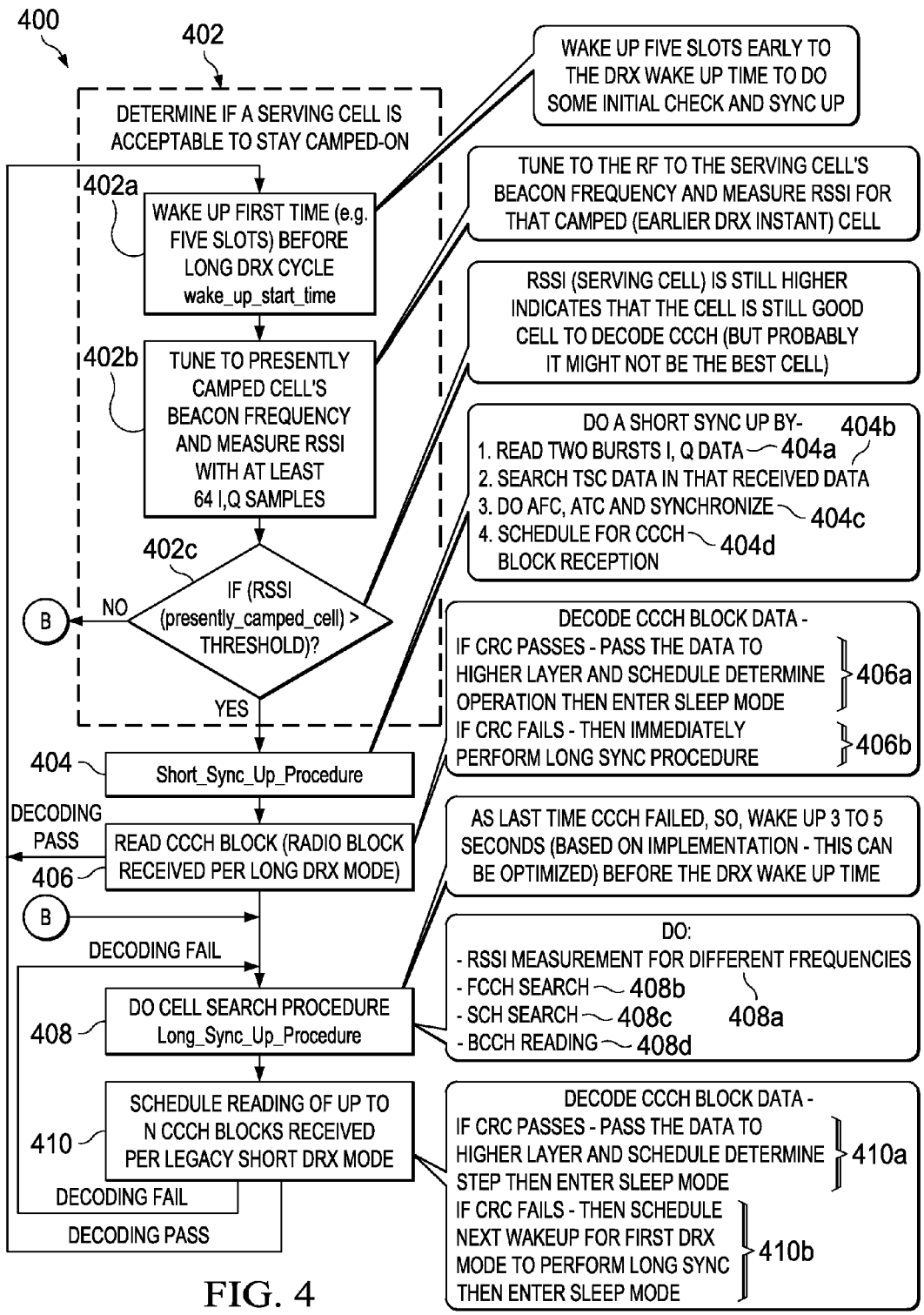
FIG. 4 is a flow chart of a method in the mobile station (e.g., MTC) for implementing paging cycles with a longer duration than in the past in accordance with another embodiment of the present invention.

Referring to FIG. 4, there is a flow chart of a method 400 in the mobile station 106 (e.g., MTC device 106) for implementing paging cycles with a longer duration than in the past in accordance with another embodiment. The mobile station 106 comprises at least one processor 116 and at least one memory 118 that stores processor-executable instructions, wherein the at least one processor 116 interfaces with the at least one memory 118 to execute the processor-executable instructions such that the mobile station 106 is operable at step 402 to determine if a serving cell $110_{1b}$ (for example) is acceptable to stay camped-on. For example, the mobile station 106 can perform step 402 as follows: (1) wake-up (step 402a) a predetermined first time (e.g., five slots before LONG DRX cycle wake-up time) before a start time of a paging cycle based on the first DRX mode, which has a longer time period than a legacy second DRX mode; (2) tune (step 402b) to a radio frequency of a beacon channel of the serving cell $110_{1b}$ and measure a RSSI of the beacon channel from the serving cell $110_{1b}$; and (3) compare (step 402c) the RSSI to a threshold value. If the RSSI is greater than the threshold value then the serving cell $110_{1b}$ is acceptable to stay camped-on. Otherwise, if the RSSI is less than or equal to the threshold value then the serving cell $110_{1b}$ is not acceptable to stay camped-on.

If the mobile station 106 determines that the serving cell $110_{1b}$ is acceptable to stay camped-on, then at step 404, the mobile station 106 performs a first type of synchronizing procedure (i.e., short synchronizing procedure). For example, the mobile station 106 can perform the first type of synchronizing procedure as follows: (1) read (step 404a) a predetermined number of bursts from a received beacon channel of the serving cell $110_{1b}$; (2) search (step 404b) for a Training Sequence Code (TSC) in the read bursts to confirm cell identification of the serving cell $110_{1b}$; (3) perform (step 404c) Automatic Frequency Control (AFC) operations and Automatic Time Control (ATC) operations; and (4) schedule (step 404d) for reception of the radio block 114. After step 404, the mobile station 106 performs step 406 and attempts to read the radio block 114 (e.g., CCCH block 114). It is to be noted that the mobile station 106 will attempt to read the radio block 114 (e.g., CCCH block 114) only if it successfully performed the first type of synchronizing procedure (step 404). If the mobile station 106 is able to read the received radio block 114 (e.g., able to decode the radio block 114 and CRC passes), then at step 406a, the mobile station 106 then (1) performs an action based on content in the received radio block 114 (e.g., passes the data to a higher layer), (2) schedules a next wake-up time based on the first DRX mode (i.e., long DRX mode) to perform the determination of step 402, and then (3) enters sleep mode. If the mobile station 106 is not able to read the received radio block 114 (e.g., not able to decode the radio block 114 or the CRC does not pass), then at step 406b, the mobile station 106 immediately performs the second type of synchronizing procedure (i.e., long synchronizing procedure).

If the mobile station 106 determines that the serving cell $110_{1b}$ is not acceptable to stay camped-on during step 402 (FIG. 4's numeral "B" which indicates the connection between step 402c and step 408) or if the mobile station 106 is not able to read the received radio block 114 during step 406, then at step 408, the mobile station 106 immediately performs the second type of synchronizing procedure and thereby discovers a new serving cell $110_{1a}$ (for example). It is to be noted that the mobile station 106 may also perform step 408 if the mobile station 106 did not successfully perform the first type of synchronizing procedure (step 404). For example, the mobile station 106 can perform the second type of synchronizing procedure as follows: (1) perform (step 408a) Received Signal Strength Indicator (RSSI) measurement for different frequencies; (2) perform (step 408b) Frequency Correction Channel (FCCH) search; (3) perform (step 408c) Synchronization Channel (SCH) search; and (4) read (step 408d) Broadcast Control Channel (BCCH) information. After step 408, the mobile station 106 at step 410 schedules readings of up to N radio blocks 114 (e.g., CCCH blocks 114) in the new serving cell $110_{1a}$ (for example) to be received per the legacy second DRX mode, wherein N>1. If one of the N radio blocks 114 is successfully read (step 410a), then the mobile station 106 will (1) perform an action based on content of the read one of the N radio blocks, (2) schedule a next wake-up time based on the first DRX mode to perform the determination of step 402, and then (3) enter sleep mode. Otherwise, if none of the N radio blocks 114 is successfully read (step 410b), then the mobile station 106 will (1) schedule a next wake-up time based on the first DRX mode to perform the second type of synchronizing procedure (step 408), and then (2) enter sleep mode. The method 400 is further described next.

Once the long DRX period is set, the mobile station 106 will only wake up, e.g., 5 slots earlier than its nominal long DRX paging block 114 (determined according to the actual long DRX wakeup time) is scheduled to be received from its serving cell $110_{1b}$ (for example) in order to perform some limited initial check and sync up procedures, as illustrated in steps 402 and 402a. The mobile station 106 will thereby verify whether it is already in-sync with the same serving cell $110_{1b}$ it was camping on when it last successfully performed these limited operations. When the limited operations are performed, the serving cell $110_{1b}$ might not actually be the best cell at that point, but if the mobile station 106 is still synchronized with the serving cell $110_{1b}$, then the mobile station 106 will proceed. The steps corresponding to these limited operations are as below:

(1) Tune to the RF of the serving cell's beacon frequency and measure RSSI thereon (step 402b).

(2) Compare and determine whether the RSSI of the serving cell $110_{1b}$ is still higher than a threshold or not (step 402c).

(3) If the result of step (2) is yes, that indicates the mobile station 106 can continue with its current serving cell $110_{1b}$ and perform the following:

a. Perform a short sync up procedure, where the mobile station 106 will search the TSC number in any received normal burst (i.e., to confirm the cell ID has not changed since the last time the mobile station 106 successfully performed the limited set of operations) (steps 404a and 404b), perform the frequency and time correction (step 404c), then schedule the CCCH reading (i.e., the mobile station 106 schedules the reading of its nominal paging block 114 determined according to the long DRX mode) (step 404d).

b. If the CCCH reading is successful (i.e., a valid radio block 114 is read), then the mobile station 106 acts accordingly and goes to sleep again after scheduling its next wakeup according to the long DRX mode, wherein the mobile station 106 will wake up a few TSs early (e.g., 5 TSs) to perform the limited initial check and sync up procedures (steps 402 and 404).

4. If the CCCH reading of step 3a is unsuccessful (i.e., a valid radio block 114 is not read) or if the result of step (2) is no, which means that the present cell $110_{1b}$ is not suitable for signal reception, then the mobile station 106 could proceed to (1) immediately perform the initial cell search method (i.e., second synchronizing procedure, long synchronizing procedure)(step 408) and thereby discover a new serving cell $110_{1a}$ (for example), and (2) then schedule the reading up to N paging blocks 114 in the new serving cell $110_{1a}$, for example, determined according to its short DRX mode (i.e., legacy DRX mode) on the CCCH where N can have a default value (e.g., 2) or be transmitted as part of system information on the BCH of the new serving cell $110_{1a}$ (step 410).

This means that each BSS $104_1, 104_2 \ldots 104_n$ which is managing cells $110_{1a}, 110_{1b} \ldots 110_{1x}, 110_{2a}, 110_{2b} \ldots 110_{2x}$, and $110_{na}, 110_{nb} \ldots 110_{nx}$ in the applicable paging area 113 will, after transmitting an initial page 114 (e.g., radio block 114, CCCH block 114) according to the long DRX mode in each cell $110_{1a}, 110_{1b} \ldots 110_{1x}, 110_{2a}, 110_{2b} \ldots 110_{2x}$, and $110_{na}, 110_{nb} \ldots 110_{nx}$ of the paging area 113, and determining that a corresponding page response 115 was not received, then repeat the transmitting of the page 114 up to 'N' times in each of these cells $110_{1a}, 110_{1b} \ldots 110_{1x}, 110_{2a}, 110_{2b} \ldots 110_{2x}$, and $110_{na}, 110_{nb} \ldots 110_{nx}$ according to the short DRX mode starting 'X' seconds after determining that the BSS 104 did not receive a page response 115 for the initial page 114, where 'X' reflects the amount of time the mobile station 106 needs to perform the initial cell search method (i.e., second synchronizing procedure, long synchronizing procedure. A detailed description about the BSS $104_1$ (for example) performing this particular functionality is described below with respect to FIG. 5's steps 502, 504 and 512 (i.e., labeled "alternative embodiment").

5. After scheduling and successfully reading a radio block 114 in one of the up to 'N' nominal short DRX mode paging blocks 114, the mobile station 106 will act on the content of that radio block 114 accordingly and then go to sleep again after scheduling its next wakeup according to the long DRX mode (step 410a). Otherwise, the mobile station 106 schedules its next wakeup according to the long DRX mode (step 410b) but will wake up much earlier (e.g., 3 to 5 seconds) before its nominal long DRX paging block and perform the initial cell search method (i.e., second synchronizing procedure, long synchronizing procedure) again as described above with respect to step 408.

It should be appreciated that the number of short DRX mode paging blocks 114 being transmitted between two long DRX mode paging blocks 114 is expected to be quite large, which means that even if, e.g., the mobile station 106 reads three or four short DRX mode paging blocks 114 in the new serving cell $110_{1a}$ (for example), it will still represent a dramatic reduction in the total number of paging blocks 114 read compared to what the mobile station 106 would have read over the time period spanned by a long DRX mode cycle using legacy DRX mode. This repeated transmission of paging blocks over a short interval (defined by the legacy DRX mode) after the long DRX paging cycle helps the mobile station 106 to successfully decode the paging message 114 it was unable to read within its nominal paging block. When long DRX is employed in the system, then the paging cycle will be very long. Thus, in such case, if the mobile station 106 (i.e., device) misses the paging message transmitted within its nominal paging block 114, then ideally the mobile station 106 has to wait for a long time (e.g., 1 hour or so, based on the long DRX period) to get the next paging message. As such, by reading one or more paging blocks 114 over a short interval (defined by the legacy DRX mode) occurring after its nominal paging block 114, the mobile station 106 (i.e., device) need not have to wait for the next paging block occurring according to its long DRX cycle.

In addition, it should be appreciated that how much time the mobile station 106 needs to perform the initial cell search method (i.e., second synchronizing procedure, long synchronizing procedure) will determine how long the BSS $104_1$, $104_2 \ldots 104_n$ should wait after it determines that it has not received a response 115 to the initial page 114 and begins transmitting up to 'N' repeats of the initial page 114 according to the short DRX mode. Furthermore, if performing the initial cell search method (i.e., second synchronizing procedure, long synchronizing procedure) results in the mobile station 106 winding up in a different routing area, then it may also mean the mobile station 106 has moved to a different paging area, in which case the mobile station 106 will not receive any of the up to 'N' repeated pages 114, but this should not occur very often.

In view of the foregoing discussions with respect to FIGS. 2-4, one skilled in the art will appreciate that the present invention can utilize two configurations—long and short DRX modes, wherein the long DRX mode is the new inventive mode, while the short DRX mode is the legacy mode. There could be several different options for the configuration switching between long and short DRX modes, for example some options are described as below:

1. For long DRX capable devices, the core network node 102 could change the paging repetitions and duration in case the paging response 115 is not received after X amount of time.

2. In case the mobile station 106 loses synchronization while reading a paging message 114 (radio block 114), the mobile station 106 could (a) transmit an indication 117 to core network node 102 indicating the non-reception of paging message 114, and when the core network node 102 received this indication, then the core network node 102 could quickly transmit to the BSS $104_1$ (for example) a message containing information that the BSS $104_1$ needs to generate and transmit on the radio interface a radio block containing the paging message 114, or (b) transmit an indication to the BSS $104_1$ (for example), which would normally keep the paging message 114 for a little longer time than the BSS $104_1$ would for the non-long DRX capable devices (i.e., traditional mobile stations) so that on reception of the special indication 117 from the mobile station 106, then the BSS $104_1$ could retransmit the page 114 instead of involving core network node 102. A detailed description about the BSS $104_1$ (for example) performing this particular functionality is described below with respect to FIG. 5's steps 502, 504, 506, and 510 (i.e., labeled "one embodiment").

3. The BSS $104_1$ (for example) keeps track (e.g., maintains a record) of the paging messages 114 for the mobile station 106 (i.e., long DRX capable device 106) for a longer period of time than the BSS $104_1$ keeps track of a radio block (paging message) broadcast to a traditional mobile station (i.e., non-long DRX capable device). In addition, the BSS $104_1$ after transmitting the paging message 114, keeps track to see if a paging response 115 is received from the particular mobile station 106. If the BSS $104_1$ does not receive the paging response 115 from the mobile station 106 after X amount of time, then the BSS $104_1$ can retransmit the page message 114 by itself without involving the core network node 102 (e.g., SGSN 102). A detailed description about the BSS $104_1$ (for example) performing this particular functionality is described below with respect to FIG. 5's steps 502, 504, 506, and 508 (i.e., labeled "one embodiment").

Figure 5:
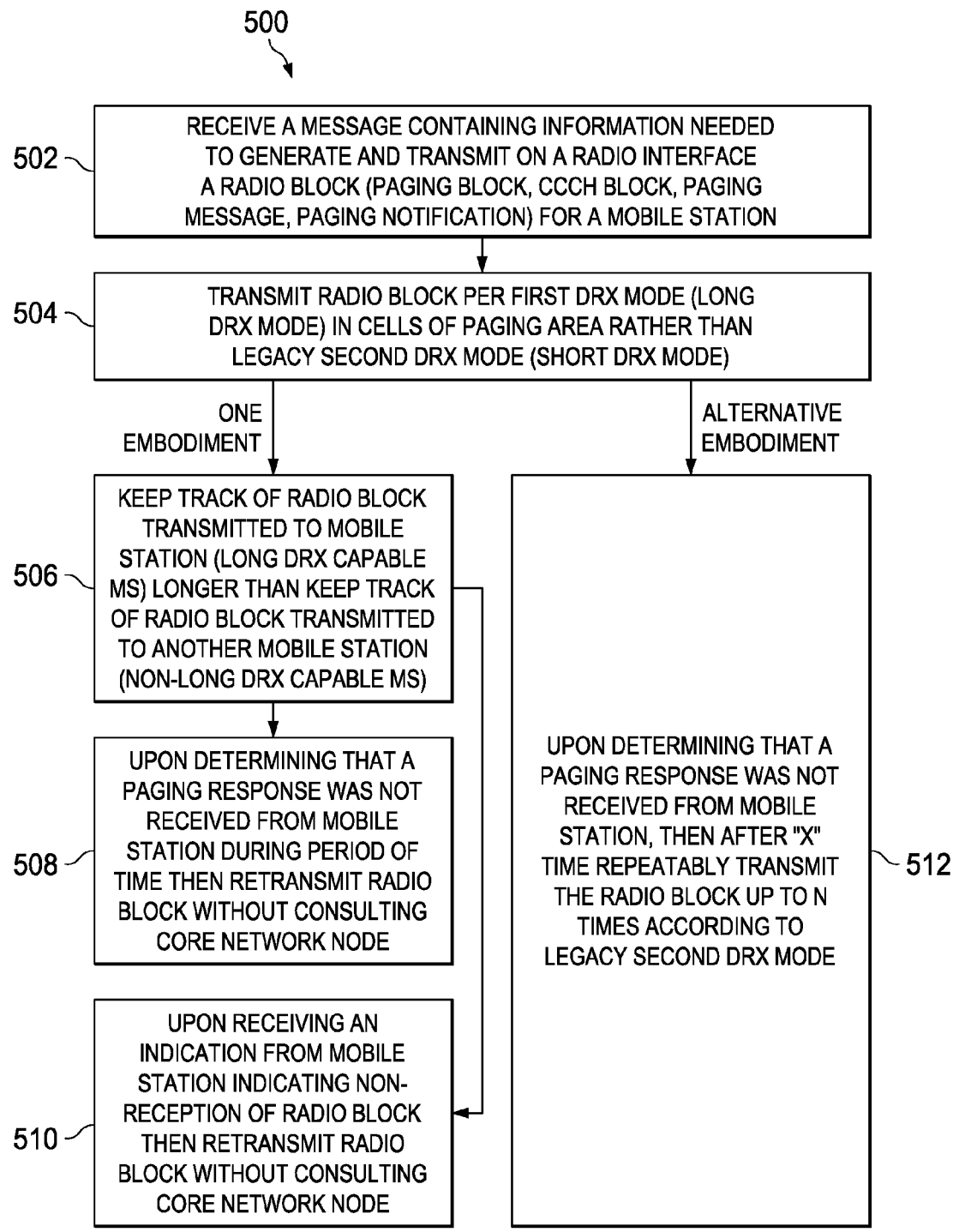
FIG. 5 is a flow chart of a method in the BSS for implementing paging cycles with a longer duration than in the past in accordance with different embodiments of the present invention.

Referring to FIG. 5, there is a flow chart of a method 500 in the BSS $104_1$ (for example) for implementing paging cycles with a longer duration than in the past in accordance with the different embodiments. The BSS $104_1$ comprises at least one processor 120 and at least one memory 122 that stores processor-executable instructions, wherein the at least one processor 120 interfaces with the at least one memory 122 to execute the processor-executable instructions such that the BSS $104_1$ is operable at step 502 to receive, from the core network node 102, a message 111 containing information the BSS $104_1$ needs to generate and transmit one radio interface a radio block 114 (e.g., paging block 114, CCCH block 114, paging message 114, paging notification 114) for mobile station 106 (see also FIG. 1). The BSS $104_1$ is further operable at step 504 to transmit (broadcast) the radio block 114 according to a first DRX mode rather than a legacy second DRX mode in one or more cells $110_{1a}, 110_{1b} \ldots 110_{1x}$ of the paging area 113 of the mobile station 106, wherein the first DRX mode has a longer time period than the legacy second DRX mode. According to the labeled "one embodiment" section in the flowchart, the BSS $104_1$ after step 504 is operable per step 506 to keep track of the radio block 114 transmitted according to the first DRX mode to the mobile station 106 longer than the BSS $104_1$ keeps track of a radio block transmitted to another mobile station (i.e., non-long DRX capable mobile station) according to the legacy second DRX mode. Then, the BSS $104_1$ at step 508, upon determining that a paging response 115 was not received from the mobile station 106, will after a predetermined time retransmit the radio block 114 to the mobile station 106 without involving the core network node 102. The steps 502, 504, 506, 508 and 510 correspond with the mobile station 106 operation described above with respect to FIG. 3. Or, the BSS $104_1$ at step 510, upon receiving an indication 117 from the mobile station 106 indicating non-reception of the radio block 114, will retransmit the radio block 114 to the mobile station 106 without involving the core network node 102. According to the labeled "alternative embodiment" section in the flowchart, the BSS $104_1$ after step 504 is operable per step 512 such that the BSS $104_1$, upon determining that a paging response 115 was not received from the mobile station 106, will after a predetermined time repeatedly transmit the radio block 114 according to the legacy second DRX mode up to N times in the one or more cells $110_{1a}$, $110_{1b}$ ... $110_{1x}$ of the paging area 113. The steps 502, 504 and 512 correspond with the mobile station 106 operation described above with respect to FIG. 4.

Figure 6:
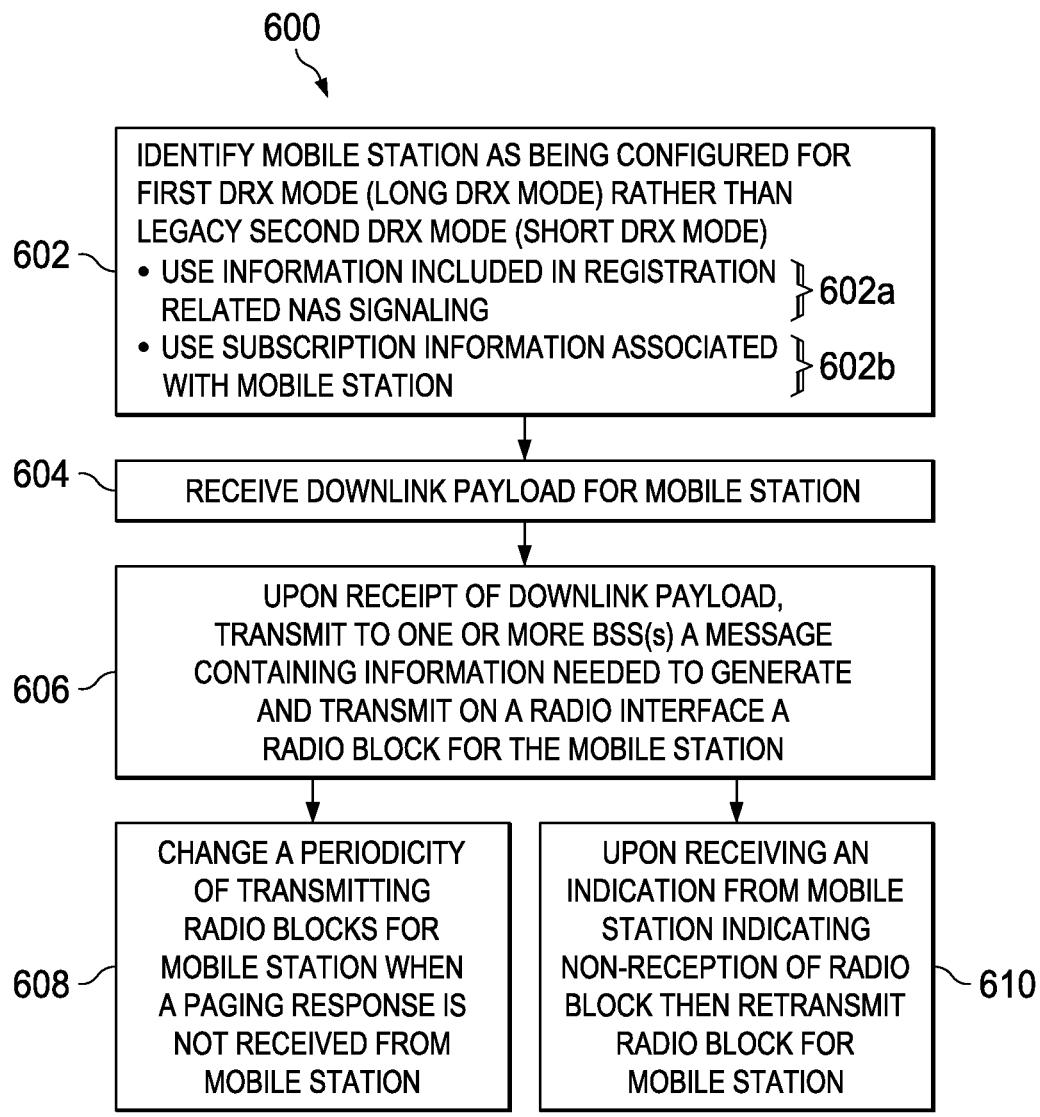
FIG. 6 is a flow chart of a method in the core network node for implementing paging cycles with a longer duration than in the past in accordance with an embodiment of the present invention.

Referring to FIG. 6, there is a flow chart of a method 600 in the core network node 102 for implementing paging cycles with a longer duration than in the past in accordance with an embodiment. The core network node 102 comprises at least one processor 124 and at least one memory 126 that stores processor-executable instructions, wherein the at least one processor 124 interfaces with the at least one memory 126 to execute the processor-executable instructions such that the core network node is operable at step 602 to identify the mobile station 106 as being configured per a first DRX mode rather than a legacy second DRX mode, wherein the first DRX mode has a longer time period than the legacy second DRX mode. For example, the core network node 102 can identify the mobile station 106 as being configured per a first DRX mode rather than a legacy second DRX mode based on (1) using (step 602a) information included in registration related Non Access Stratum (NAS) signaling, or (2) using (step 602b) subscription information associated with the mobile station 106, wherein the core network node 102 can obtain the subscription information from the HLR 108. At step 604, the core network node 102 is operable to receive the downlink payload 112 for the mobile station 106. Upon receipt of the downlink payload 112, the core network node 102 performs step 606 and transmits to the BSSs $104_1$, $104_2$ ... $104_n$ which manage cells $110_{1a}$, $110_{1b}$ ... $110_{1x}$, $110_{2a}$, $110_{2b}$ ... $110_{2x}$, and $110_{na}$, $110_{nb}$ ... $110_{nx}$ in the paging area 113 of the mobile station 106, a message 111 containing information needed to generate and transmit on a radio interface a radio block 114 (e.g., paging block 114, CCCH block 114, paging message 114, paging notification 114) for mobile station 106 per the first DRX mode. After step 606, the core network node 102 performs step 608 and changes the duration (periodicity) of transmitting messages 111 to the BSSs $104_1$, $104_2$ ... $104_n$ that result in the transmission of radio blocks 114 for the mobile station 106) when a paging response 115 is not received from the mobile station 106 during a predetermined amount of time. Or, the core network node 102 after step 606 can perform step 610 wherein, upon receiving an indication 117 from the mobile station 106 indicating the non-reception of the radio block 114, the core network node 102 retransmits a message 111 to the BSSs $104_1$, $104_2$ ... $104_n$ that results in the transmission of the radio block 114 for the mobile station 106. The mobile station 106 can transmit the indication 117 when the mobile station 106 has received the radio block 114 but lost synchronization such that the mobile station 106 could not finish decoding the radio block 114.

One skilled in the art should appreciate that the disclosed techniques result in a large power savings gain for the mobile station 106. For example, if the legacy DRX cycle is 10 minutes and the new long DRX cycle is 1000 minutes and the observation period for battery energy saving in the mobile station 106 is three days (i.e., the normal battery back time), then it was found that the energy saving ratio will be almost three thousand times. The detailed computation is provided below in TABLE #1.

TABLE #1

| Power consumption for each CCCH reading = PC_ccch (uJ) = 400 | Power consumption for each BSIC reading = PC_bsic (uJ) = 200 | Power consumption for each BA list reading = PC_ba (uJ) = 600 | Power consumption for RSSI reading for 8 neighbor cells 5 times = PC_rssi (uJ) = 1000 | Power consumption for each short sync up procedure = PC_short_sync (uJ) = 30 | Power consumption for each BSIC reading = PC_long_sync (uJ) = 10000 | Probability of 1st CCCH fail = 40% = 0.4 |
|---|---|---|---|---|---|---|
| Occurrence of CCCH reading in observation period | Occurrence of BSIC reading in observation period | Occurrence of BA reading in observation period | Occurrence in observation period | Occurrence of short Sync in observation period | Occurrence of long sync in observation period | Occurrence of CCCH reading in observation period |
| 4.32 [using proposed Long DRX method with DRX cycle of 1000 min] | 0 | 0 | 0 | 2.592 | 1.728 | 4.32 |
| 17280 [using legacy DRX method with DRX cycle of 0.25 min] | 8640 | 8640 | 51840 | | | |

| | |
|---|---|
| Power Consumption (mJ) Legacy | 65664000 |
| Power Consumption (mJ) New | 19085.76 |
| Power Saving Ratio (Legacy/New) | 3440.470801 |
| DRX Cycle Legacy (in min) = 0.25 min | |
| DRX Cycle New (in min) = 1000 min | |
| Observation Period = 3 days = 4320 min | |

In normal scenarios, most of the time the mobile station 106 will perform the short synchronization process (i.e., short sync up) since the signal strength of the serving cell serving cell $110_{1b}$ (for example) does not change very frequently in normal operation. This will help to save (i.e., conserve) the battery power as the mobile station 106 will avoid having to perform the idle mode tasks most of time. The following are some additional exemplary advantages of the disclosed techniques:

(1) The mobile station 106 (and other similar devices 106) will stay for a long period of time in the sleep mode.

(2) Conventionally, a mobile station needs to wake up to perform several tasks related to idle mode that are not required with the disclosed techniques, in which the mobile station 106 will wake up only in the DRX cycle and do what is required as discussed above with respect to FIGS. 2-4. This increases the sleep duration and that saves (i.e., conserves) the batter power of the mobile station 106.

(3) The power saving ratio between the traditional method and the newly proposed method is very significant, as illustrated in TABLE #1.

(4) The mobile station 106 does not have to do the periodic RSSI measurement, BSIC conf/re-conf, and BCCH reading according to a fixed minimum periodicity. Thus, there is no need for the mobile station 106 to wake-up and perform periodic tasks according to a fixed minimum periodicity and instead the mobile station 106 will only wake up at the DRX cycle. As such the duration of the DRX cycle could be anything as the wake-up interval will, to a great extent, no longer be impacted or restricted by the need to support fixed tasks requiring a minimum periodicity of execution due to elimination of some idle mode cell re-selection related tasks and introduction of the short sync up procedure.

(5) MTC devices 106 (or sensor type of devices) will be helped, where battery power conversation is especially important.

(6) The mobile station 106 continues to be able to receive an initial page 114 that was missed on its nominal long DRX mode paging block by immediately performing the initial cell search method following the detection of an RRSI on the new serving cell $110_{1a}$ (for example) (e.g., detected using the limited initial check and sync up procedures and determined to have a RSSI greater than a threshold) and then looking for up to N repeats of the initial page 114 using its short DRX mode in the new serving cell $110_{1a}$, as illustrated in FIG. 4. This may be of importance for the case where the delivery of payload 112, though not time critical in general, should still be performed within the time period spanned by a long DRX cycle, as this may be part of the contracted quality of service for a given MTC application.

(7) The consumption of energy by the mobile station 106 is reduced while in idle mode, which leads to a significant decrease in the rate that battery power of the mobile station 106 is drained.

The aforementioned mobile station 106, the core network node 102, the BSSs $104_1$, $104_2$ ... $104_n$, and various methods 200, 300 and 400 of the present invention can also have one or more of the following features:

1. A method to reduce power usage in a terminal or mobile station 106, comprising performing wake-up and synchronization procedures according to a long DRX period.

1A. The method of feature 1, further comprising on every wakeup from DRX sleep mode, the mobile station 106 verifies whether it is already connected to an earlier camped cell or if it has moved, by first measuring the received signal strength indication (RSSI) of the previously camped cell and comparing it with a threshold value.

1B. The method of feature 1A, wherein if the RSSI of the previously camped cell is greater than a threshold, the mobile station 106 assumes that it is still connected to the earlier cell and, based on the result, the mobile station 106 determines whether to perform a short sync up or a long sync up with a network.

1C. The method of feature 1, wherein in a long DRX period, the periodic RSSI measurement, BSIC conf/re-conf, broadcast control channel (BCCH) reading, AFC and similar operations are delayed or deferred to reduce battery power.

2. A method of reducing battery usage in a mobile station 106, comprising performing a faster sync up wherein the mobile station 106 reads any normal burst and performs the frequency synchronization, time synchronization using known TSC data in the burst, and then prepares for Common Control Channel (CCCH) reception, wherein this short sync up takes few slots of time.

2A. The method of feature 2, wherein the mobile station 106 does not need to wait for the frequency correction channel (FCCH).

3. A method of reducing battery usage in a mobile station 106, comprising performing a long sync up, wherein the mobile station 106 performs the same operations as it did after powering on when CCCH decoding fails or when a mobile station 106 has lost the prior cell, as detected by the algorithm or process described herein.

Further, the cellular network 100 is shown and described herein as being configured per the GSM standard, but it should be appreciated that the cellular network 100 and other components of the present invention can be configured per UTRA, E-UTRA or any other radio access technology wherein the reachability of wireless devices 106 therein has historically been based on the assumption that all deliveries of downlink packet data payload requires a rather low latency in the area of a few seconds. Finally, it should be appreciated that the present invention is not limited to mobile stations 106's that are characterized as MTC devices but could be any type of device if desired.

Referring to FIGS. 7A-7D, there are various diagrams illustrating how the mobile station 106 (e.g., MTC 106) can implement paging cycles which are longer than in the past in accordance with different embodiments of the present invention. The present invention associated with the different embodiments shown and described with respect to FIGS. 7A-7D has four main features:

(1) Introduction of Long DRX cycle:—where the mobile station 106 wakes up for reading the paging message 114 at a much longer interval when compared to the legacy DRX cycles. For example, with a long DRX cycle, the mobile station 106 can be in the sleep mode (e.g., power saving mode) for a prolonged time (e.g., a few hours or days).

(2) Introduction of short sync up procedure and faster validation of suitability of the previously camped cell $110_{1b}$ (for example) and identifying cell-reselection need: where, upon waking-up from sleep mode shortly before reading the CCCH (paging) block 114, the mobile station 106 will quickly complete the needed sync up activities and check whether the previously camped cell $110_{1b}$ is still good enough to stay camped on or not. These sync up activities and check also indirectly indicate whether the mobile station 106 has changed the cell location or not, from its cell location in the previous wake-up period.

(3) Idle mode task optimization (wake-up period activity reduction): there are several methods/procedures described herein to reduce/optimize the idle mode (wake phase activity reduction) tasks of the mobile station 106.

(4) Introduction of short DRX mode for paging message re-transmission: when the mobile station 106 misses any paging message 114 due to sync up or some other issues, then to allow the mobile station 106 to still have a chance to receive a page 114, the network 100 might repeat the CCCH (paging) message 114 shortly after sending the nominal CCCH block message.

These four main ideas are discussed in more detail below:
1. Introduction of Long DRX Cycle:

The legacy DRX cycle is short, e.g., about 0.47 to 2.12 seconds. In the novel embodiments of this application, the DRX cycle (long DRX cycle, first DRX mode) is proposed to be increased from a few seconds to a few hours or days for mobile station (device) power saving.

Figure 7A:
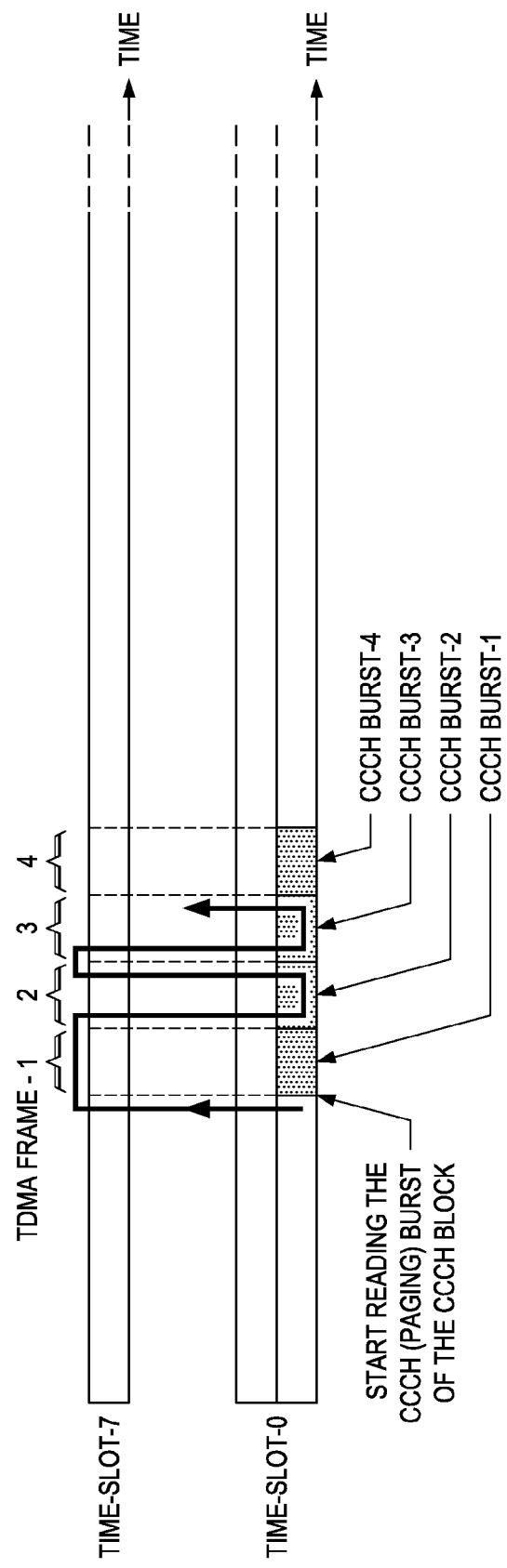

2. Introduction of Short Sync Up Procedure and Faster Validation of Suitability of the Previously Camped Cell $110_{1b}$ (for Example) and Identifying Cell-Reselection Need:

When there is no impending task to be performed for a certain duration, the mobile station 106 enters into sleep mode by cutting (e.g., interrupting or pausing) the clocks and voltages to its different modules and sub-modules for power saving purposes. Before entering into sleep mode, the mobile station 106 programs (e.g., sets or configures) the timer to generate an interrupt at time 'T' to wake up. Generally, the time 'T' is set based on the DRX cycle (period) employed for this specific mobile station 106. That means, ideally, the mobile station 106 should wake up shortly before the first burst of the CCCH (paging) block corresponding to its nominal paging group (e.g., wherein every CCCH block contains 4 bursts that are transmitted over 4 TDMA frames). For reference, FIG. 7A illustrates the GSM frame structure and the CCCH block reception. However, if the DRX cycle length is longer (as described herein to introduce the longer DRX cycle) compared to the legacy DRX cycle length, then the mobile station 106 will be in sleep mode for a prolonged time, which provides more power saving gain. It is to be noted that if the mobile station 106 stays for a long duration in sleep mode, then there could be two issues as follows:

- The mobile station 106 might lose the frequency and time synchronization with the network 100, since the mobile station's local clock and time will deviate gradually from the network's clock with respect to time.
- The mobile station 106 might change the location (cell) and move to the new location (cell) when the mobile station 106 was in sleep mode (e.g., DRX inactivity period), which means that the mobile station 106 will not be able to communicate with the new cell unless the mobile station 106 performs a location area update (LAU) or a routing area update (RAU).

In the past, when the traditional mobile station, after a long sleep, wakes up for page reception (or for any uplink transmission), then the mobile station most commonly performs the long sync up procedure (also referred to herein as sync up-2 procedure or the second type of synchronizing procedure) for achieving synchronization (as per the first point above). Subsequently, the mobile station performs the BCCH reading (e.g., system information reading). From the system information, the mobile station determines or identifies its present cell location and, if the present cell location is not the same as the earlier cell location, then the traditional mobile stations sends a location area (LA) update or a routing area (RA) update message to the network (as per the second point above). In particular, the traditional mobile station, as a part of the long sync up procedure, first measures the RSSI of different carriers in different supported frequency bands (e.g., as listed in the cell database in SIM or earlier performed cell selection data). The traditional mobile station then orders the cell frequencies according to the measured signal strengths (i.e., RSSIs), and this list is known as the ordered cell list. Then, the traditional mobile station tunes its RF unit to receive the first frequency in the RSSI ordered cell list (e.g., highest signal strength cell frequency) and searches the FCCH (frequency correction channel) for frequency correction. If the FCCH is found in that cell frequency, then the traditional mobile station programs for SCH (synchronization channel) reception on that cell frequency using the known cell ID (e.g., BSIC—base station identity code) and the time frame structure of that cell. Next, the traditional mobile station searches for BCCH reading for obtaining system information. The traditional mobile station then camps on the cell if that cell is permitted to be camped. This is the normal procedure. The traditional mobile station also performs, after a power-on, an initial synchronizing procedure. The initial synchronizing procedure takes a long time to perform, e.g., on the order of 2 to 5 seconds. The traditional mobile station loses a lot of power by performing this initial synchronizing procedure on every wake-up due to the long duration and the required processing overhead.

Figure 7B:
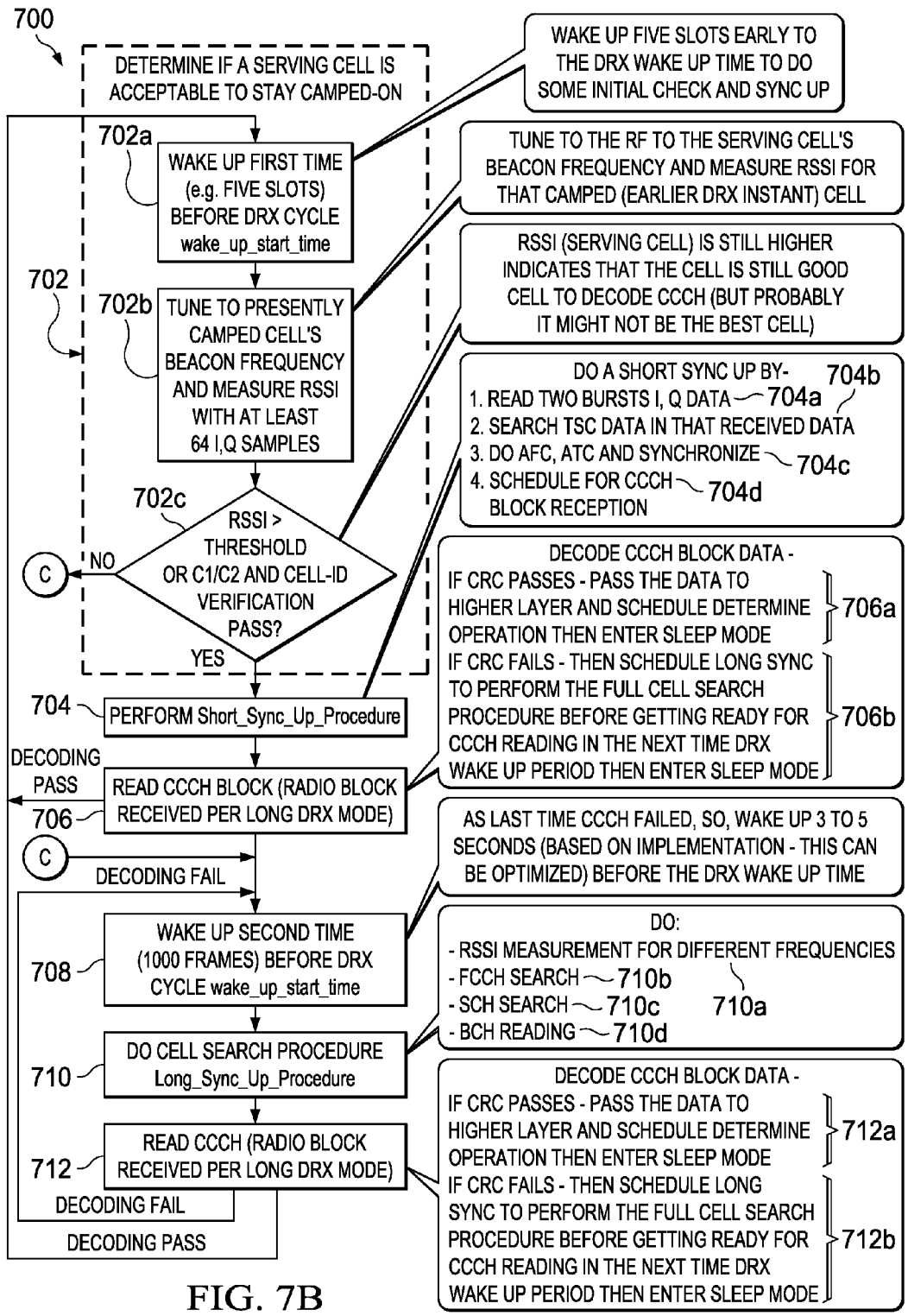

In contrast, the present invention proposes that the mobile station 106 is configured to implement the short sync up procedure (i.e., sync up-1 or first synchronizing procedure), where the mobile station can quickly perform the sync up (as discussed in the first point above) and cell identification (as discussed in the second point above). This is also illustrated in FIGS. 7B and 7C. According to one embodiment of the present invention, the new short sync up procedure has the following features:

- The mobile station 106 programs the timer (e.g., using an interrupt) to wake up a few time slots (e.g., 5 time slots) ahead of its nominal DRX cycle, e.g., before receiving the first burst of the CCCH block 114 intended for that mobile station 16, according to that mobile station's DRX cycle, as illustrated in FIG. 7A.
- After waking up a few time slots ahead of the intended CCCH burst 114, the mobile station 106 will tune to the same cell frequency (i.e., the frequency camped-on earlier before the wake-up time) and receive a signal, followed by passing the corresponding digital (I,Q) signal to the mobile station's baseband for processing:

I. The mobile station 106 will receive the several bursts and try to synchronize (i.e., time and frequency) with the network (e.g., in particular service cell $110_{1b}$) by reading the FCCH burst (FB), the Synchronization burst (SB), or the Normal burst (NB).

II. As defined in the specification 3GPP TS 45.002 V10.3.0 (2012-03), section 5.2.3, "[for] BCCH and CCCH, the TSC must be equal to the BCC, and as defined in 3GPP TS 23.003 . . . . " The Training sequence number (TSC#) inside a Normal burst of time slot zero should contain a TSC number that is directly mapped to a cell ID (e.g., Base station identity—BCC). The contents of these 3GPP TS specifications are hereby incorporated by reference herein. Accordingly, by checking the TSC number (TSC#) in the Normal burst (NB), the mobile station 106 can confirm whether it is monitoring the same cell or not. For example, during the previous wake-up phase, the mobile station 106 may have found that the CELL-ID is 4 (e.g., BCC=4). As CELL-ID and TSC# in the Normal burst (NB) are mapped, the mobile station 106 will also find the TSC# in the NB to be 4, e.g., TSC#4. In the next wake-up, the mobile station 106 should check the TSC number in the NB, and if the TSC number is found to be 4, then this somewhat indicates that the mobile station 106 is monitoring the same cell $110_{1b}$ (i.e., CELL-ID) as the cell that the mobile station 106 was monitoring in the previous wake-up. Thus, cell identification is performed indirectly here.

III. Also, in parallel, the mobile station 106 will also measure the RSSI of the tuned received signal from the received I,Q signal, where $$RSSI = (1/M) \cdot \sum_{m=0}^{m=M-1} \sqrt{(I_m^2 + Q_m^2)},$$

M is the total number of signal samples in any received burst (slot), and m indicates the signal sample number in the received signal and varies from 0 to (M−1). The mobile station 106 checks whether the measured RSSI from that cell frequency is above a threshold value or not. If it is above a threshold value, then that indicates that the previously camped cell is still better to stay/remained camped on (i.e., no need for cell-reselection). This might happen very often if the mobile station 106 has not changed the location to another cell (e.g. low mobility or stationary type of mobile station). Also, from the above measured RSSI, the mobile station 106 can compute and check the C1/C2 criteria (as defined in 3GPP TS 45.008 V9.0.0 (2009-09) sec. 6.4, wherein the contents of this 3GPP TS specification are hereby incorporated by reference herein) to determine whether cell reselection is needed now or not. Most of the time, when C1/C2 criteria passes, then there is no need for reselection or switching to another new cell.

If the RSSI threshold criteria (or C1/C2 criteria) passes as in step-III above and also the normal burst's TSC# matches with the expected TSC# as in step-II above, then that indicates that the mobile station 106 is still in the same cell (or the previously connected/camped cell is still good enough to be camped on and communicate with network 100). This above procedure is referred to herein as the short sync up procedure. It is to be noted that FIGS. 2-4 illustrate slightly different short sync up procedures, any one of which is an improvement over the legacy short sync up procedure. In performing this short sync up procedure, the mobile station 106 may take 2 to 10 ms to sync up (the first point above) and validate the cell (the second point above).

Step-I, II and III could be performed by the mobile station 106 in parallel, which would reduce the time required to perform sync up and cell identification. That is, comparing the RSSI to the threshold value and performing at least a portion of the first type of synchronizing procedure (i.e., the short sync up procedure) may be performed in parallel. For example, time and frequency synchronization, TSC verification, and RSSI measurement with the C1/C2 criteria evaluation may be performed in parallel. When the mobile station 106 receives the several bursts and measures the RSSI values, the mobile station 106 may verify the TSC# obtained in the received several bursts.

It should be noted that the last used camped/serving cell might not be the best cell to stay camped on now, but if the mobile station 106 is managing to synchronize with that cell, the expected TSC is confirmed and the RSSI (C1/C2) criterion is fulfilled, and this cell will be considered as a sufficiently good cell to stay camped on to receive paging messages 114 or to start an uplink (e.g., RACH) transmission. Once a communication link is established (i.e., a TBF is set up), the mobile station 106 might eventually move to the best suitable cell as per the aforementioned legacy cell re-selection procedure.

Figure 7D:
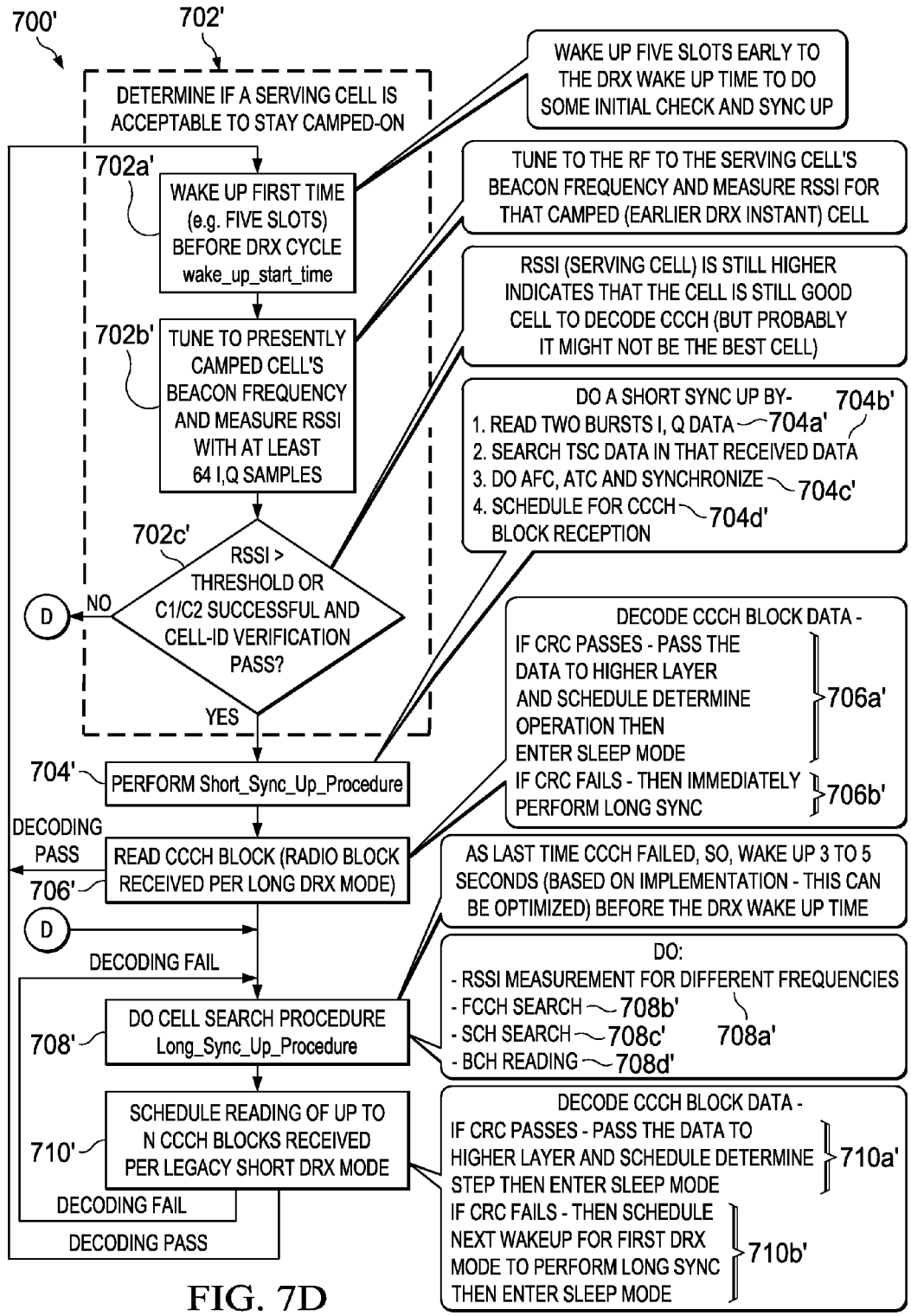
Figure 7E:
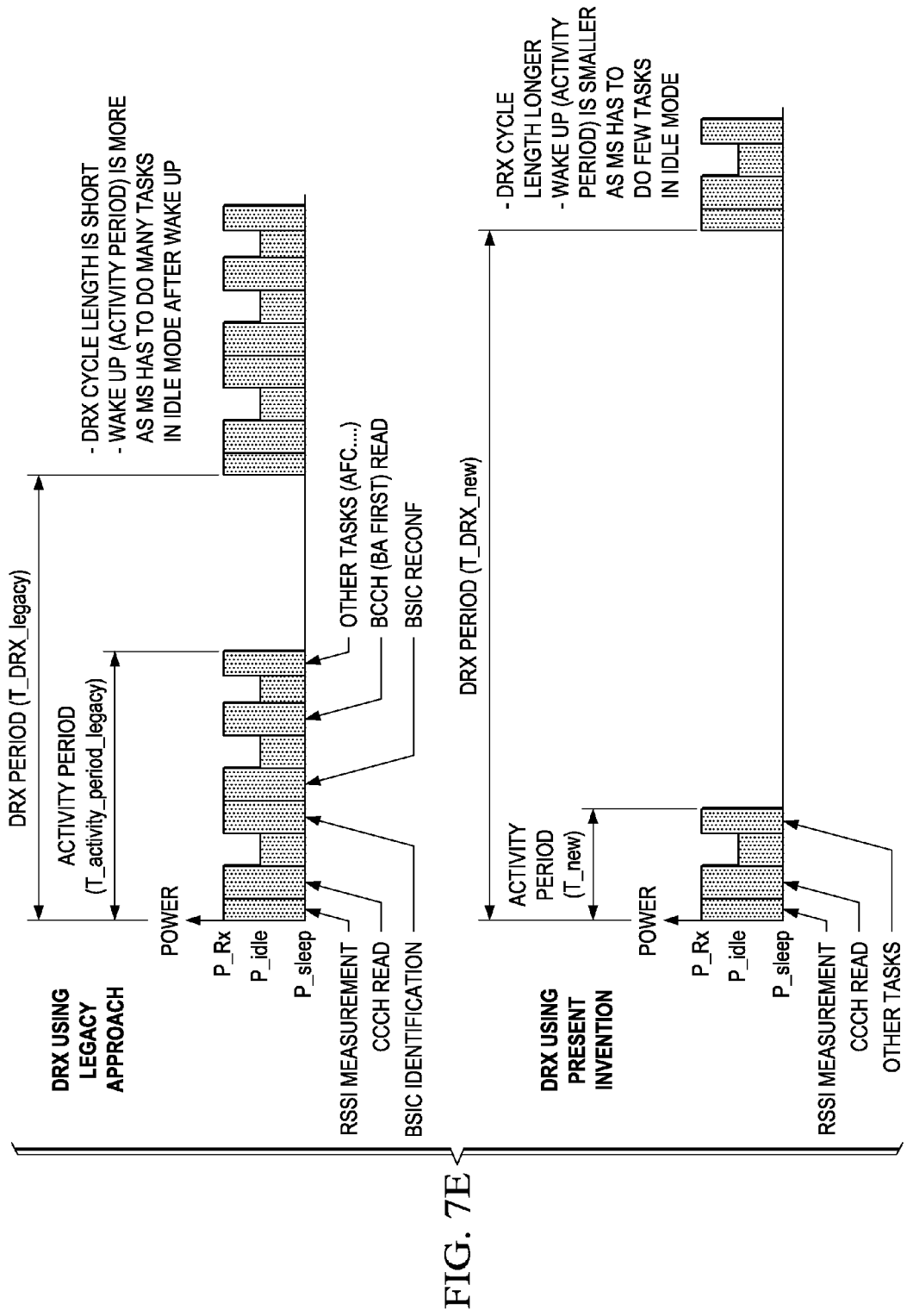
FIG. 7E is a diagram illustrating how battery power saving gain can be achieved using the disclosed techniques relative to the approach of legacy paging cycles.

As described herein, the mobile station 106 is configured to perform both the short sync up procedure and the long sync up procedure depending on the circumstances, as illustrated in FIGS. 7B-7D. In any case, when the mobile station 106 employs the long sync up procedure, then the mobile station 106 has to wake up much earlier (e.g., at least 2 seconds ahead of the intended CCCH block 114) to perform the long sync up procedure, whereas in case of the short sync up procedure, the mobile station 106 has to wake up a few slots ahead (e.g., 2 ms ahead of the intended CCCH burst 114) in order to perform the short sync up procedure.

3. Idle Mode Task Optimization (Wake-Up Period Activity Reduction):

In general, in the legacy method existing today, the traditional mobile station performs the following processing overhead steps while in idle mode (once the mobile station has camped to a suitable serving cell) in addition to monitoring its own paging group on the paging channel:
1. Read BCCH information for BA list: mobile station reads BCCH to get neighbor cell list.
2. Make periodic RSSI Measurements for the neighbor cells identified using step (1).
3. Identify BSIC by reading FCCH and SCH of the cells in the neighbor cell list to identify the cell-ID. If a new cell is found, add to the cell database for periodic monitoring.
4. BSIC reconfirmation: re-confirms cell-ID of the already detected neighbor and serving cells by reading SCH.
5. Cell reselection: periodic neighbor cell measurements/ BCCH Read and camp to the best detected neighbor cell.
6. LA/RA update: perform NAS procedures for updating the LA and RA as needed.
7. AFC: does the frequency correction of the local clock.

All these tasks put a significant burden on the traditional mobile station in idle mode that leads to significant power consumption just to keep the mobile station synchronized with the network for receiving paging messages in a time critical manner. In the present invention, the processing overhead is reduced by eliminating the execution of the above tasks for the mobile station 106 while in idle mode on a periodic basis and instead having the mobile station 106 executing those tasks on an as needed basis as follows:
No periodic RSSI measurement.
No background neighbor cell search.
No BA list reading, e.g., no BCCH reading every 30 sec.
No SCH reading for BSIC reconfirmation every 30 sec.
Follow the procedure as shown in FIG. 7B.

Referring to FIG. 7B, there is a flow chart of a method 700 in the mobile station 106 (e.g., MTC 106) for implementing paging cycles with a longer duration than in the past in accordance with an embodiment of the present invention. The mobile station 106 comprises at least one processor 116 and at least one memory 118 that stores processor-executable instructions, wherein the at least one processor 116 interfaces with the at least one memory 118 to execute the processor-executable instructions such that the mobile station 106 is operable at step 702 to determine if a serving cell $110_{1b}$ (for example) is acceptable to stay camped-on. For example, the mobile station 106 can perform step 702 as follows: (1) wake-up (step 702a) a predetermined first time (e.g., five slots before DRX cycle wake-up time) before a start time of a paging cycle based on the first DRX mode, which has a longer time period than a legacy second DRX mode; (2) tune (step 702b) to a radio frequency of a beacon channel of the serving cell $110_{1b}$ and measure a RSSI of the beacon channel from the serving cell $110_{1b}$; and (3) compare (step 702c) the RSSI to a threshold value or C1/C2 and, if this is successful, determine if cell-ID verification passed. C1 is a path loss criterion parameter for cell selection, and C2 is a path loss criterion parameter for cell reselection obtained by calculation of the receiving level and number of parameters. 3GPP TS 43.022 V11.0.0 section 6.4 defines C1 and C2. The contents of this 3GPP TS specification are hereby incorporated by reference herein. If the comparison step 702*c* is passed, then the serving cell 110$_{1b}$ is acceptable to stay camped-on and the process proceeds to step 704, discussed below. If the comparison step 702*c* is not passed, then the serving cell 110$_{1b}$ is not acceptable to stay camped-on and the process proceeds to step 708, discussed below.

If the mobile station 106 determines that the serving cell 110$_{1b}$ is acceptable to stay camped-on then the method 700 proceeds to step 704, wherein the mobile station 106 performs a first type of synchronizing procedure (i.e., sync up-1 procedure, short synchronizing procedure). For example, the mobile station 106 can perform the first type of synchronizing procedure as follows: (1) read (704*a*) a predetermined number of bursts (e.g., two bursts) from a received beacon channel of the serving cell 110$_{1b}$; (2) search (704*b*) for a Training Sequence Code (TSC) in the read bursts to confirm cell identification of the serving cell 110$_{1b}$; (3) perform (704*c*) Automatic Frequency Control (AFC) operations and Automatic Time Control (ATC) operations; and (4) schedule (704*d*) for reception of the radio block 114 (e.g., CCCH block 114). In this embodiment, step 702*c* and step 704 can be performed in parallel if desired. After step 704, the mobile station 106 performs step 706 and attempts to read the radio block 114 (e.g., CCCH block 114). It is to be noted that the mobile station 106 will attempt to read the radio block 114 (e.g., CCCH block 114) only if the mobile station 106 successfully performed the first type of synchronizing procedure, which is also the case for the above mentioned methods 200, 300 and 400. If the mobile station 106 is able to read the received radio block 114 (e.g., able to decode the radio block 114 and CRC passes) then the method 700 proceeds to step 706*a*, wherein the mobile station 106 then (1) acts on content in the received radio block 114 (e.g., passes the data to a higher layer), (2) schedules a next wake-up time based on the first DRX mode (i.e., long DRX mode) to perform the determine operation 702, and then (3) enters sleep mode. If the mobile station 106 is not able to read the received radio block 114 (e.g., not able to decode the radio block 114 or the CRC does not pass) then the method 700 proceeds to step 706*b*, wherein the mobile station 106 then schedules the second type of synchronizing procedure (i.e., sync up-2 procedure, long synchronizing procedure) to perform the full cell search procedure before getting ready for the radio block reading (CCCH reading) in the next time DRX wake-up period and then enters sleep mode.

If the mobile station 106 determines that the serving cell 110$_{1b}$ is not acceptable to stay camped-on during step 702 or if the mobile station 106 is not able to read the received radio block 114 during step 706, then the method 700 proceeds to step 708, wherein the mobile station 106 wakes-up a predetermined second time (e.g., 1000 frames before the DRX cycle wake-up time) before a start time of a next paging cycle based on the first DRX mode (i.e., long DRX mode) to perform, at step 710, the second type of synchronizing procedure. It is to be noted that the mobile station 106 may also perform step 708 if the mobile station 106 did not successfully perform the first type of synchronizing procedure at step 704, which is also the case for the above mentioned methods 200, 300 and 400. For example, the mobile station 106 can perform the second type of synchronizing procedure as follows: (1) perform (step 710*a*) Received Signal Strength Indicator (RSSI) measurement for different frequencies; (2) perform (step 710*b*) Frequency Correction Channel (FCCH) search; (3) perform (step 710*c*) Synchronization Channel (SCH) search; and (4) read (step 710*d*) Broadcast Control Channel (BCCH) information. After step 710, the mobile station 106 at step 712 attempts to read another radio block 114*a* (e.g., another CCCH block 114*a*). If the mobile station 106 is able to read the another received radio block 114*a* (e.g., decode the another radio block 114*a* and CRC passes), then the method 700 proceeds to step 712*a*, wherein the mobile station 106 then (1) acts on content in the another received radio block 114*a* (e.g., passes the data to a higher layer), (2) schedules a next wake-up time based on the first DRX mode to perform the determine operation 702, and then (3) enters sleep mode. If the mobile station 106 is not able to read the another received radio block 114*a* (e.g., not able to decode the another radio block 114*a* or the CRC does not pass), then the method 700 proceeds to step 712*b*, wherein the mobile station 106 then schedules the second type of synchronizing procedure (i.e., sync up-2 procedure, long synchronizing procedure) to perform the full cell search procedure before getting ready for another radio block reading (e.g., CCCH reading) in the next time DRX wake-up period and then enters sleep mode.

Stated another way, the method 700 can be summarized as follows: where upon wake up, the mobile station 106 tries to perform a short sync up, and if successful, then the mobile station 106 prepares for reading the CCCH block 114, and if the CCCH decoding passes, then the mobile station 106 is programmed to wake up a few slots ahead for performing a short sync in the next wake-up time. If cell identification (step-II) or RSSI (C1/C2) (step-III) criteria failed, then the mobile station 106 will program the wake-up time much ahead of the actual DRX wake-up time, as this time the mobile station 106 has to perform the long sync up procedure before reading the CCCH block 114 (i.e., paging message 114). If decoding fails again, then the mobile station 106 will program itself to wake up 1000 frames (for example) ahead of CCCH reception to perform the long sync up procedure, unless if successful, then the mobile station 106 will program itself to wake up a few slots (for example) ahead of CCCH reception to perform the short sync process. If desired, the "RSSI>C1/C2" & "Perform_Short_sync_up_procedure" can be performed in parallel (i.e., steps I, II, III above).

4. Introduction of Short DRX Mode for Paging Message Re-Transmission (Repeated Case):

On top of the long DRX (where the mobile station 106 is paged over a long defined paging interval as mentioned in main feature 2), the mobile station 106 can also be paged after a short period (e.g., short DRX) if the network 100 does not receive any response 115 from the mobile station 106 for a defined time. The short DRX will be performed after a defined time, which is suitable for the mobile station 106 to do the long sync up and get ready for reading the CCCH block 114. This option allows the mobile station 106 to still have a chance to receive a page 114 (when the mobile station misses the CCCH/Paging block 114 for the first time when the mobile station is reading the CCCH block 114 after waking up from the sleep mode), which the BSS 104$_1$ (for example) might have sent using its nominal long DRX block for the case of first paging block reception failure. In this embodiment, the core network node 102 (e.g., SGSN 102), the BSS 104$_1$ and the mobile station 106 could further proceed as follows:

1. The SGSN 102 would, after not receiving a response 115 to the page 114 determined by the long DRX cycle, trigger the sending of up to 'N' repeats of the initial page 114 according to the short DRX mode. N can have a default value (e.g., 2), or N can be sent as part of System Information on the BCCH of the new serving cell. FIG. 7C illustrates repetition of a page 114 according to the short DRX cycle just immediately or virtually immediately (e.g., without delay) following a page 114 according to the long DRX cycle. The repetition should be sufficiently delayed to allow the mobile station 106 to, if needed, find a new suitable cell to camp on. This means that once the mobile station 106 is unsuccessful in reading the CCCH block 114 after a short sync (i.e., due to any reason like short sync failure, Cell ID not matching, RSSI being below a threshold, or due to some other reason), then the mobile station 106 can quickly do the long sync (e.g., similar to an initial sync up) and prepare for reading the repeated version of the CCCH block 114.

2. The BSS 104₁ would, in turn, page the mobile station 106 using paging blocks 114 according to the short DRX mode, where the page 114 will be repeated again after a short interval. The delay interval might be the same as the time the mobile station 106 generally needs to perform the long sync procedure.

3. The mobile station 106 would immediately or virtually immediately (e.g., without delay) perform initial cell search and, upon finding a suitable cell, schedule the reading of up to 'N' paging blocks 114 determined according to the mobile station's short DRX mode (i.e., legacy DRX mode).

4. After successfully reading the page 114, the mobile station 106 will act as per legacy procedures. If no page is found, the mobile station will go to sleep again after scheduling the mobile station's next wakeup according to the long DRX mode.

This embodiment may be of importance for the case where the payload 112 delivery, though not time critical in general, should still be performed within the time period spanned by a long DRX cycle, as this may be part of the contracted quality of service for a given MTC application. This method is also described below with respect to FIG. 7D.

Referring to FIG. 7D, there is a flow chart of a method 700' in the mobile station 106 (e.g., MTC 106) for implementing paging cycles with a longer duration than in the past in accordance with another embodiment of the present invention. The mobile station 106 comprises at least one processor 116 and at least one memory 118 that stores processor-executable instructions, wherein the at least one processor 116 interfaces with the at least one memory 118 to execute the processor-executable instructions such that the mobile station 106 is operable at step 702' to determine if a serving cell 110₁ᵦ (for example) is acceptable to stay camped-on. For example, the mobile station 106 can perform step 702' as follows: (1) wake-up (step 702a') a predetermined first time (e.g., five slots before DRX cycle wake-up time) before a start time of a paging cycle based on the first DRX mode, which has a longer time period than a legacy second DRX mode; (2) tune (step 702b') to a radio frequency of a beacon channel of the serving cell 110₁ᵦ and measure an RSSI of the beacon channel from the serving cell 110₁ᵦ; and (3) compare (step 702c') the RSSI to a threshold value or C1/C2 and, if this is successful, then determine if cell-ID verification passed. C1 is a path loss criterion parameter for cell selection, and C2 is a path loss criterion parameter for cell reselection obtained by calculation of the receiving level and a number of parameters. 3GPP TS 43.022 V11.0.0 section 6.4 defines C1 and C2. The contents of this 3GPP TS specification is hereby incorporated by reference herein. If the comparison step 702c' is passed then the serving cell 110₁ᵦ is acceptable to stay camped-on and the process proceeds to step 704' (discussed below). If the comparison step 702c' is not passed then the serving cell 110₁ᵦ is not acceptable to stay camped-on and the process proceeds to step 708' (discussed below).

If the mobile station 106 determines that the serving cell 110₁ᵦ is acceptable to stay camped-on then the process proceeds to step 704', wherein the mobile station 106 performs a first type of synchronizing procedure (i.e., sync up-1 procedure, short synchronizing procedure). For example, the mobile station 106 can perform the first type of synchronizing procedure as follows: (1) read (704a') a predetermined number of bursts (e.g., two bursts) from a received beacon channel of the serving cell 110₁ᵦ; (2) search (704b') for a Training Sequence Code (TSC) in the read bursts to confirm cell identification of the serving cell 110₁ᵦ; (3) perform (704c') Automatic Frequency Control (AFC) operations and Automatic Time Control (ATC) operations; and (4) schedule (704d') for reception of the radio block 114. In this embodiment, step 702c' and step 704' can be performed in parallel if desired. After step 704', the mobile station 106 performs step 706' and attempts to read the radio block 114 (e.g., CCCH block 114). It is to be noted that the mobile station 106 will attempt to read the radio block 114 (e.g., CCCH block 114) only if the mobile station 106 successfully performed the first type of synchronizing procedure, which is also the case for the above mentioned methods 200, 300 and 400. If the mobile station 106 is able to read the received radio block 114 (e.g., able to decode the radio block 114 and CRC passes), then the process proceeds to step 706a', wherein the mobile station 106 then (1) acts on content in the received radio block 114 (e.g., passes the data to a higher layer), (2) schedules a next wake-up time based on the first DRX mode (i.e., long DRX mode) to perform the determine operation 702', and then (3) enters sleep mode. If the mobile station 106 is not able to read the received radio block 114 (e.g., not able to decode the radio block 114 or the CRC does not pass), then the process proceeds to step 706b', wherein the mobile station 106 then (1) schedules the second type of synchronizing procedure (i.e., long synchronizing procedure) to perform the full cell search procedure before preparing to read the radio block (i.e., CCCH reading) in the next time DRX wake-up period and (2) then enters sleep mode.

If the mobile station 106 determines that the serving cell 110₁ᵦ is not acceptable to stay camped-on during step 702' or if the mobile station 106 is not able to read the received radio block 114 during step 706', then the process proceeds to step 708', wherein the mobile station 106 immediately or virtually immediately (e.g., without delay) performs the second type of synchronizing procedure. It is to be noted that the mobile station 106 may also perform step 708' if the mobile station 106 did not successfully perform the first type of synchronizing procedure at step 704', which is also the case for the above mentioned methods 200, 300 and 400. For example, the mobile station 106 can perform the second type of synchronizing procedure as follows: (1) perform (step 708a') Received Signal Strength Indicator (RSSI) measurement for different frequencies; (2) perform (step 708b') Frequency Correction Channel (FCCH) search; (3) perform (step 708c') Synchronization Channel (SCH) search; and (4) read (step 708d') Broadcast Control Channel (BCCH) information. After step 708', the mobile station 106 at step 710' schedules readings of up to N radio blocks 114 (e.g., CCCH blocks 114) to be received per the legacy second DRX mode, wherein N>1. If one of the N radio blocks 114 is successfully read (step 710a'), then the mobile station 106 will (1) act on content thereof (e.g., passes the data to a higher layer), (2) schedule a next wake-up time based on the first DRX mode to perform the determine operation 702', and then (3) enter sleep mode. Otherwise, if none of the N radio blocks 114 is successfully read (step 710b'), then the mobile station 106 will (1) schedule a next wake-up time based on the first DRX mode to perform the second type of synchronizing procedure (step 708'), and then (2) enter sleep mode.

Advantages of Short Sync Procedure Over Long Sync Procedure (Long DRX Period with Optimized Wakeup Activities):

The power savings for the battery of the mobile station 106 that can be achieved by applying the procedures associated with methods 700 and 700' etc. . . . are exemplified in the following discussion. In one example, with a legacy DRX cycle of 15 sec (split paging cycles on CCCH) and the new long DRX cycle of 1000 minutes and the observation period for battery energy saving of e.g., three days (assumed to be a typical battery back-up time), the energy saving ratio (gain in the power consumed in legacy idle mode operations compared to the new disclosed technique) was found to be almost 3292 times. With these assumptions and assuming no uplink or downlink data transfer, a legacy stationary device battery lasting three days can now last roughly 27 years, as discussed below with respect to TABLES 2-5. It should be noted that by using this novel technique, the power saving gain is achieved due to two factors: (1) gain due to long DRX setting (i.e., increased sleep time while operating in long DRX mode); and (2) gain due to wake-up activity time reduction. This is graphically shown in FIG. 7E, which illustrates the power gain achievable per the novel disclosed techniques.

In particular, the power saving gain can be represented as an equation where power saving gain=(DRX_cycle_new/DRX_cycle_legacy)*(Activity_period_legacy/Activity_period_new). The new long DRX cycle is much longer than the legacy DRX cycle, and this alone is a substantial part of the power savings gain realized while the mobile station 106 is in the idle phase of long DRX mode. In addition, the greater the mobile station 106's activity duration during the wake-up phase of long DRX mode, the greater the power consumption. As such, an additional substantial power savings is realized by the mobile station 106 during the wake-up phase of the long DRX mode, since the activity duration is much shorter (i.e., due to fewer idle mode tasks and short synchronizing procedure) than the activity duration associated with the wake-up phase of legacy DRX mode operation. It should be noted that scenarios like high mobility, downlink signaling failure, etc. will lead to a high incidence of the long sync up procedure. In this situation, power saving gains will still be achieved due to the first factor (i.e., the idle phase of long DRX mode) in the above equation. However, scenarios that lead to a high incidence of the long sync up procedure would have to be coupled with the use of paging repetition while in the long DRX mode (e.g., the option of dynamic conversion between long DRX and short DRX while operating in long DRX mode as described with respect to FIG. 7D) in order to ensure the mobile station 106 does not experience extended periods during which the mobile station 106 will miss pages 114.

It should also be noted that in normal scenarios, only the short sync up procedure will be needed, since the serving cell's signal strength does not change frequently in normal operation, and a large number of the devices 106 expected to benefit from the power savings techniques described herein will be stationary.

Advantages of Employing the Long DRX Period/Cycle Over Completely Switching Off the Device 106:

If the mobile station 106 is completely switched off (e.g., powered down) during the inactivity period (e.g., sleep), then after the mobile station 106 wakes up, the mobile station 106 may have to load code/software program(s) from the external memory (e.g., flash), which will lead to power consumption. Also, as the clocks, timer, etc. will be off also if the mobile station 106 is completely switched off, then at every DRX wake up, the mobile station 106 has to perform long sync up, which will consume more power. Due to advancement of technology, during sleep mode, the mobile station 106 can be put in power saving mode, where the clocks and voltages to all the modules (e.g., except the timer and interrupt generation unit and some memory refreshment unit) are cut. This helps to decrease the power consumption to be approximately similar to the power consumption when completely switching-off the mobile station 106. So, if the mobile station 106 is not switched off but rather put in the sleep mode during the long DRX period and upon wake-up, then the mobile station 106 may perform the short sync up per the present invention and become successful in reading the CCCH block 114. In this case, the mobile station 106 saves the power from not performing the long sync up or the initial power-on procedure.

Figures 1, 8A:
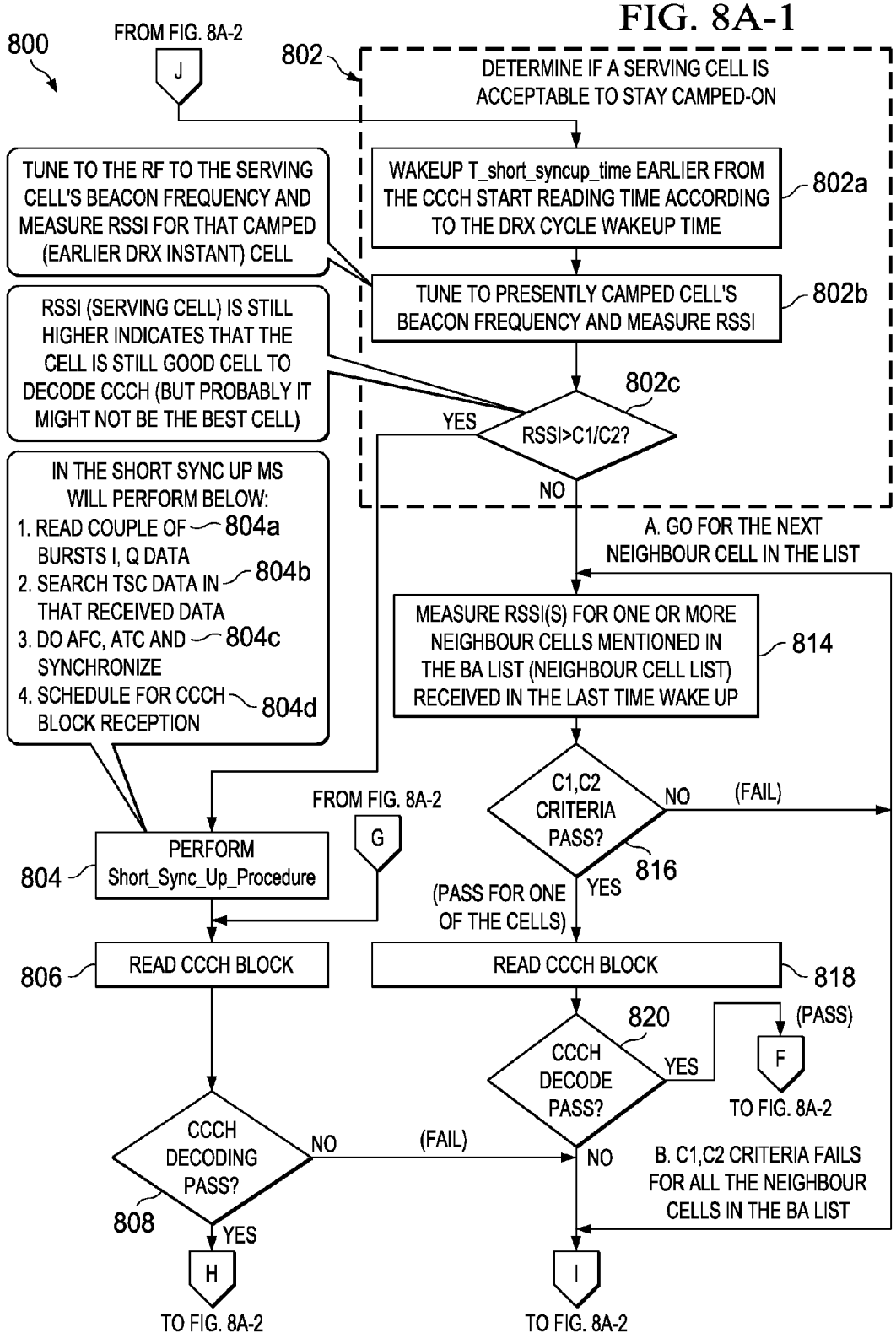
FIGS. 8A-8C are various diagrams illustrating how the mobile station (e.g., MTC) can implement paging cycles that are longer than in the past in accordance with another embodiment of the present invention.
Figures 2, 8A:
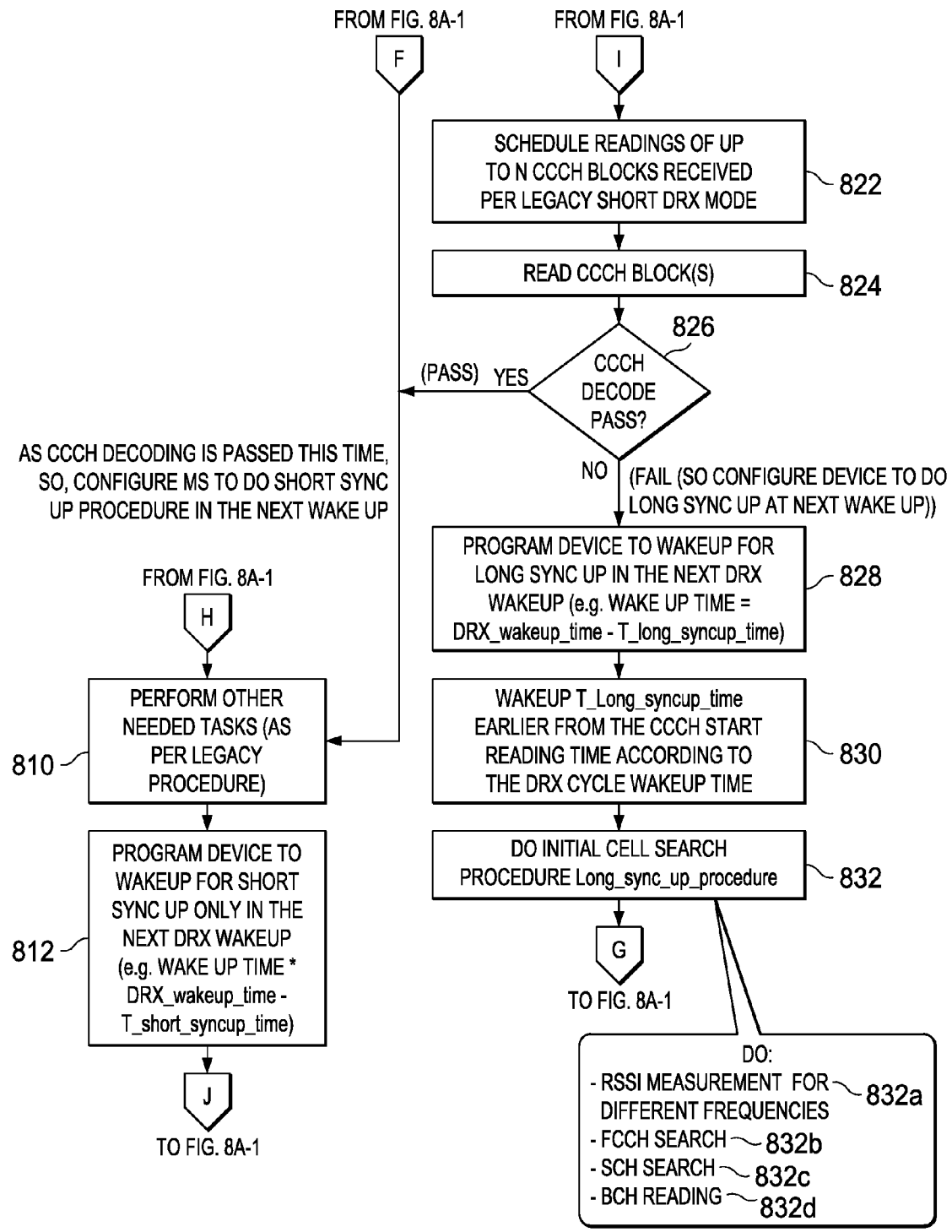
Figure 8B:
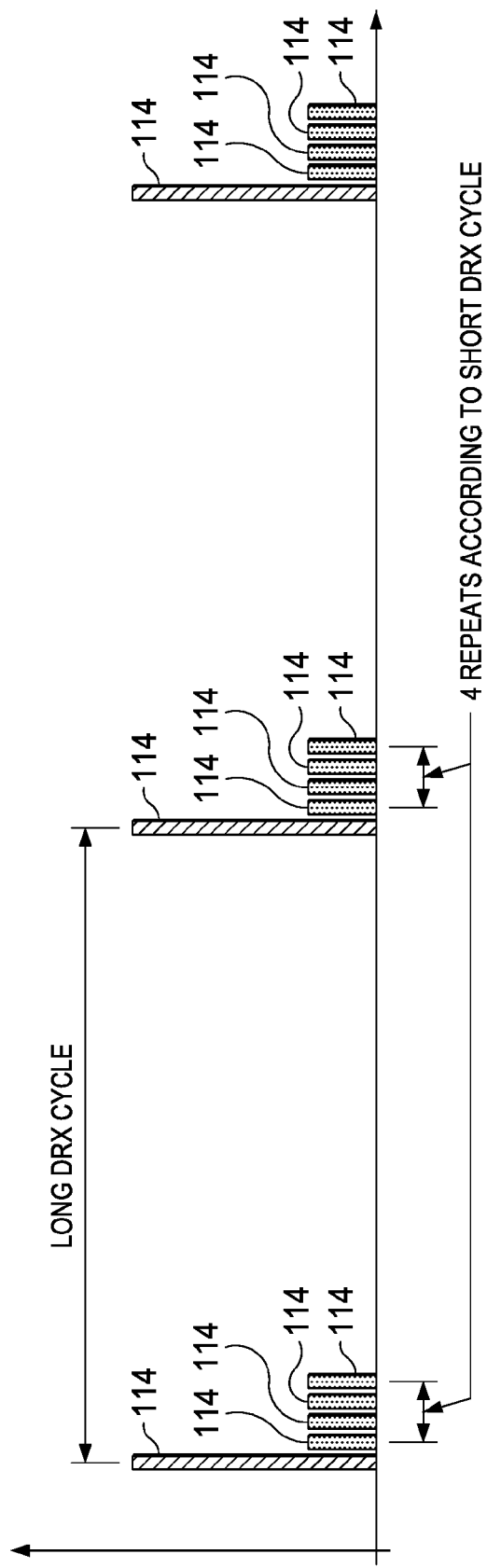
Figure 8C:
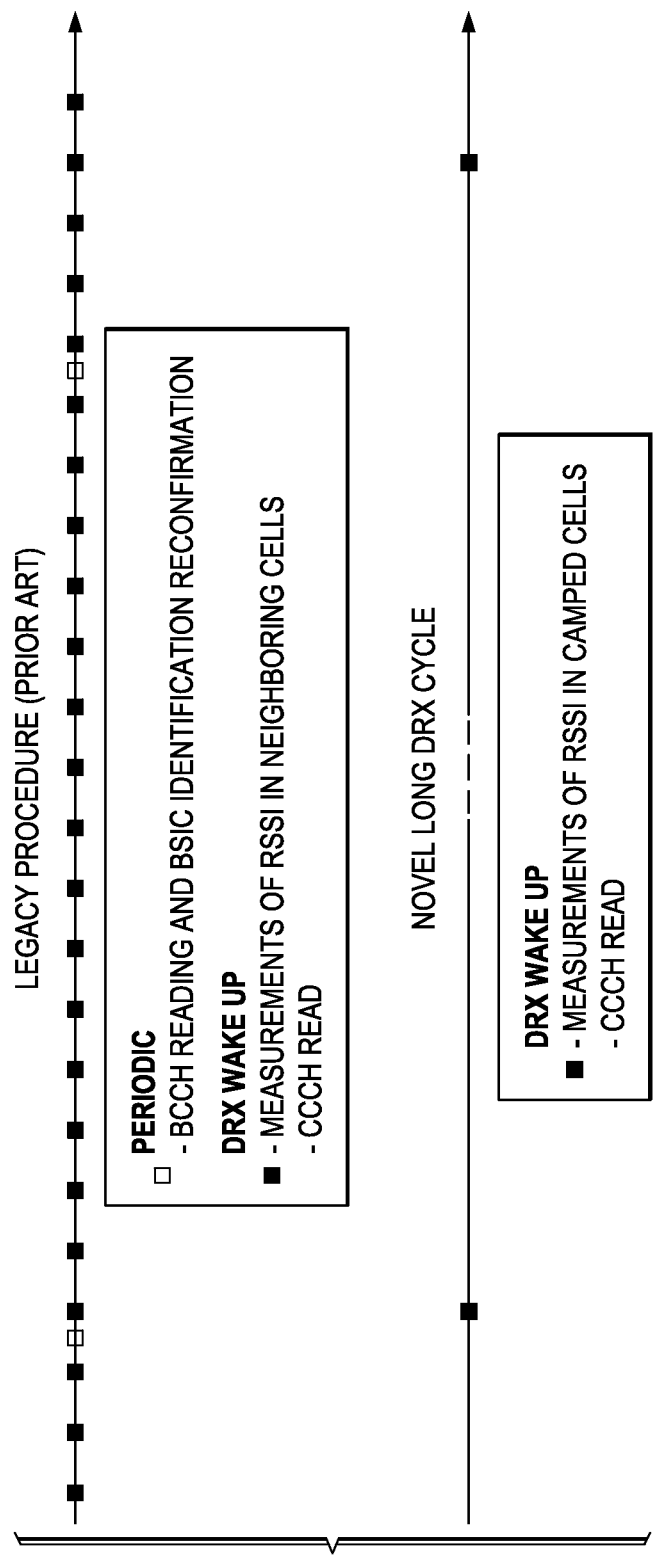

Referring to FIGS. 8A-8C, there are various diagrams describing how the mobile station 106 (e.g., MTC 106) can implement paging cycles which are longer than in the past in accordance with another embodiment of the present invention. As shown in FIGS. 8A-1 and 8A-2, there is a flow chart of a method 800 in the mobile station 106 (e.g., MTC 106) for implementing paging cycles with a longer duration than in the past in accordance with an embodiment of the present invention. The mobile station 106 comprises at least one processor 116 and at least one memory 118 that stores processor-executable instructions, wherein the at least one processor 116 interfaces with the at least one memory 118 to execute the processor-executable instructions such that the mobile station 106 is operable at step 802 to determine if a serving cell $110_{1b}$ (for example) is acceptable to stay camped-on. For example, the mobile station 106 can perform step 802 as follows: (1) wake-up (step 802a) a predetermined first time (e.g., five slots before DRX cycle wake-up time) before a start time of a paging cycle based on the first DRX mode, which has a longer time period than a legacy second DRX mode; (2) tune (step 802b) to a radio frequency of a beacon channel of the serving cell $110_{1b}$ and measure an RSSI of the beacon channel from the serving cell $110_{1b}$; and (3) compare (step 802c) the RSSI to C1/C2 (or some other threshold value) to determine if the RSSI is greater than C1/C2 (or some other threshold value). If the comparison step 802c is passed then the serving cell $110_{1b}$ is acceptable to stay camped-on and the process proceeds to step 804 (discussed below). If the comparison step 802c is not passed then the serving cell $110_{1b}$ is not acceptable to stay camped-on and the process proceeds to step 814 (discussed below).

If the mobile station 106 determines that the serving cell $110_{1b}$ is acceptable to stay camped-on, then the process proceeds to step 804, wherein the mobile station 106 performs a first type of synchronizing procedure (i.e., short synchronizing procedure, short sync up-1 procedure). For example, the mobile station 106 can perform the first type of synchronizing procedure as follows: (1) read (804a) a predetermined number of bursts from a received beacon channel of the serving cell $110_{1b}$; (2) search (804b) for a Training Sequence Code (TSC) in the read bursts to confirm cell identification of the serving cell $110_{1b}$; (3) perform (804c) Automatic Frequency Control (AFC) operations and Automatic Time Control (ATC) operations; and (4) schedule (804d) for reception of the radio block 114. After step 804, the mobile station 106 performs step 806 and attempts to read the radio block 114 (e.g., CCCH block 114). It is to be noted that (the mobile station 106 will attempt to read the radio block 114 (e.g., CCCH block 114) only if the mobile station 106 successfully performed the first type of synchronizing procedure. The mobile station 106 at step 808 determines if the mobile station 106 was able to read the received radio block 114 (e.g., able to decode the radio block 114 and CRC passes). If the mobile station 106 has determined at step 808 that the mobile station 106 is able to read the received radio block 114, then the process proceeds to step 810 wherein the mobile station 106 performs other tasks as needed per legacy procedures (e.g., act on content in the received radio block 114, such as passing the data to a higher layer), Following step 810, the process proceeds to step 812, wherein the mobile station 106 then (1) schedules a next wake-up time based on the first DRX mode (i.e., long DRX mode) to perform the determine operation 802, and (2) enters sleep mode. If the mobile station 106 is not able to read the received radio block 114 (e.g., not able to decode the radio block 114 or the CRC does not pass) at step 808, then the process proceeds to step 822 (discussed in more detail below).

If the mobile station 106 determines that the serving cell $110_{1b}$ is not acceptable to stay camped-on during step 802, then the mobile station 106 measures (step 814) the RSSI(s) for one or more neighbor cells $110_{1a}$, $110_{1x}$ (for example) identified by the last BCCH Allocation (BA) list received in the last wake-up period, and determines (step 816) if the RSSI on one of the one or more neighbor cells $110_{1a}$, $110_{1x}$ is greater than the C1/C2 (or some other threshold). It is to be noted that the mobile station 106 may also perform steps 814 and 816 if the mobile station 106 did not successfully perform the first type of synchronizing procedure at step 804. For instance, the mobile station 106 can perform steps 814 and 816 for one neighbor cell, and if the RSSI is not greater than the C1/C2, then the process repeats steps 814 and 816 for the next neighbor cell etc. . . . (see label "A") until one neighbor cell is found that has an RSSI greater than C1/C2, in which case the process proceeds to step 818, or if none of the neighbor cells have an RSSI greater than C1/C2, then the process proceeds to step 822 (see label "I"). If the result of step 816 is yes, then the mobile station 106 at step 818 attempts to read a radio block 114 (e.g., CCCH block 114) thereon. Then, the mobile station 106 at step 820 determines if the mobile station 106 was able to read the received radio block 114 (e.g., able to decode the radio block 114 and CRC passes). If the mobile station 106 has determined at step 820 that the mobile station 106 was able to read the received radio block 114 (e.g., able to decode the radio block 114 and CRC passes), then the process proceeds to step 810 (see label "F") to perform other tasks needed per legacy procedures (e.g., act on content in the received radio block 114, such as passing the data to a higher layer), and then the process proceeds to step 812, wherein the mobile station 106 then (1) schedules a next wake-up time based on the first DRX mode (i.e., long DRX mode) to perform the determine operation 802, and (2) enters sleep mode. If the mobile station 106 determined at step 820 that the mobile station 106 was not able to read the received radio block 114 (e.g., able to decode the radio block 114 and CRC passes), or if the mobile station 106 was not able to find any neighbor cells that had an RSSI greater than C1/C2 during steps 814 and 816 (see label "B"), then the mobile station 106 proceeds to step 822. At step 822, the mobile station 106 schedules readings of up to N radio blocks 114 (e.g., CCCH blocks 114) to be received per the legacy second DRX mode, wherein N>1. If the mobile station 106 was, at step 824, able to successfully read and decode at step 826 one of the N radio blocks 114, then the process proceeds to step 810 to perform other tasks needed per legacy procedures (e.g., act on content in the received radio block 114, such as passing the data to a higher layer), and then the process proceeds to step 812, wherein the mobile station 106 then (1) schedules a next wake-up time based on the first DRX mode (i.e., long DRX mode) to perform the determine operation 802, and (2) enters sleep mode.

If the mobile station 106 was, at step 826, not able to successfully read and decode one of the N radio blocks 114 at steps 824 and 826, then the process proceeds to step 828 and schedules a next wake-up time based on the first DRX mode to perform the second type of synchronizing procedure (i.e., long synchronizing procedure, long sync up procedure), and then (2) enters sleep mode. Then, the mobile station 106 at step 830 wakes-up a predetermined second time (e.g., 1000 frames before the DRX cycle wake-up time) before a start time of a next paging cycle based on the first DRX mode (i.e., long DRX mode) to perform, at step 832, the second type of synchronizing procedure. For example, the mobile station 106 can perform the second type of synchronizing procedure as follows: (1) perform (step 832a) Received Signal Strength Indicator (RSSI) measurement for different frequencies; (2) perform (step 832b) Frequency Correction Channel (FCCH) search; (3) perform (step 832c) Synchronization Channel (SCH) search; and (4) read (step 832d) Broadcast Control Channel (BCCH) information. After step 832, the mobile station 106 proceeds to step 806.

As can be seen, in addition to prolonging the paging cycles, an objective of this present invention is to propose modifications to the idle mode behavior of the mobile station 106 in order to maximize the mobile station power savings. As discussed above, in the past while the traditional mobile station was in idle mode (e.g., once the mobile station 106 has camped to a suitable serving cell) in addition to monitoring its own paging group on the paging channel would also performs the following steps:

(1) Read BCCH information for BA list: mobile station reads BCCH to get neighbor cell list.

(2) Make RSSI Measurements for the neighbor cells identified using step (1).

(3) BSIC Identification: read FCCH and SCH of the cells in the cell database (neighbor+serving) to identify the cell-ID. If a new cell is found, the new cell is added to the cell database for periodic monitoring.

(4) BSIC reconfirmation: re-confirms cell-ID of the already detected neighbor and serving cells by reading SCH.

(5) Cell reselection: periodic neighbor cell measurements/ BCCH Read and camp to best detected neighbor cell.

(6) LA/RA update: perform NAS procedures for updating the LA and RA as needed.

(7) AFC: does the frequency correction of the local clock.

All these tasks put a significant burden on the traditional mobile station in idle mode that leads to significant power consumption just to keep the traditional mobile station synchronized with the network for receiving paging messages in a time-critical manner. The novel techniques disclosed herein reduce this overhead by eliminating the execution of the above tasks on a periodic basis and instead having the mobile station 106 executing them on an as-needed basis. In particular, the disclosed techniques reduce this overhead by configuring the mobile station 106 such that, while it is in idle mode, there is no periodic RSSI measurement, no background neighbor cell search, no BA list reading (e.g., no BCCH reading every 30 seconds), and no SCH reading for BSIC reconfirmation every 30 seconds. Instead, the mobile station 106 is configured to implement the procedure as described in detail above with respect to FIG. 8A and further described below.

As shown in FIG. 8A, the mobile station 106 is configured to implement two sync-up procedures which are as follows:

Short sync-up procedure (i.e., first synchronizing procedure):

Passing the C1/C2 criterion (i.e., "RSSI>C1/C2") indicates that the previously camped cell is still good enough to stay camped on. In this case, the mobile station 106 performs short synchronization (~3 ms) by receiving several bursts and correcting the time and frequency errors. In normal operation, the mobile station 106 would change the serving cell very infrequently, which is especially true when the mobile station 106 is not moving. In such scenarios, the mobile station 106 can avoid performing any extra activities needed for cell reselection and can perform short synchronization before reading paging block 114.

Long sync-up procedure (i.e., second synchronizing procedure):

If the C1/C2 criterion fails, or the decoding (e.g., reading) of the paging block 114 (e.g., CCCH block 114) fails, the mobile station 106 performs the RSSI scan and then searches the FCCH, followed by the SCH, as performed during the initial cell selection, which might take around 2 to 5 sec.

Once the long DRX period is set, the mobile station 106 will wake up ahead of time (which is based on whether the mobile station 106 needs to perform a short sync up or a long sync up, as programmed based on the last DRX wakeup's result, as illustrated in FIG. 8A) relative to the next occurrence of its nominal long DRX paging block on its serving cell to perform the corresponding tasks, where the set of tasks performed is determined by whether the mobile station 106 wakes up to perform a short sync up or a long sync up). It is to be noted that the mobile station 106 may wake up multiple times prior to the next occurrence of its nominal long DRX paging block. For example, the short sync up procedure may need to be performed multiple times during a single long DRX cycle. Any instance of attempting to perform the short sync up procedure can result in the mobile station 106 determining that a long sync up procedure needs to be performed, in which case the mobile station 106 will program itself to wake up with enough time to complete this procedure prior to the next occurrence of its nominal long DRX paging block. Since the short sync up procedure (i.e., first synchronizing procedure, which is faster/shorter than the long sync up procedure) is a new procedure per this application that the mobile station 106 needs to perform, the short sync up procedure will be described in more detail next.

In the case of a short sync up, the mobile station 106 will attempt to synchronize to the same serving cell $110_{1b}$ (for example) that the mobile station 106 camped on in its last wake up period. The serving cell might not be the best cell to camp on, but if the mobile station 106 manages to synchronize with that serving cell, and the C1/C2 criterion (or other threshold criterion) is fulfilled, then that serving cell will be considered as a sufficiently good cell.

The steps for the RSSI measurement, C1/C2 criteria evaluation, and short sync up procedure for a mobile station operating in long DRX mode (i.e., first DRX mode) are listed below:

1. Tune to the RF frequency of the last used serving cell and measure RSSI.
2. If the RSSI is fulfilling the C1/C2 criteria,
   a. Perform a short sync up procedure, where the mobile station 106 will search the TSC number in any received Normal Burst (i.e., to confirm that the cell ID has not changed since the last time that the mobile station 106 successfully performed the limited set of operations), and will perform the frequency and time corrections. Generally, TSC# and cell-ID are directly mapped (as discussed above) and for CCCH, BCCH transmission in cell broadcast frequency, the respective TSC# is used in the Normal Burst. There is a possibility of receiving dummy or some other TSC# in a received burst in between; in that case, the mobile station 106 should read and search in several bursts to receive the expected TSC#.
   b. Schedule the CCCH block 114 reading (i.e., the mobile station 106 schedules the reading of its nominal paging block 114 determined according to the long DRX mode).
   c. If CCCH block 114 reading is successful and if a matching page is found, then the mobile station 106 acts on it. If no matching page is found, then the mobile station 106 goes to sleep and schedules its next wakeup in the next DRX cycle according to the short sync up procedure, and then proceeds as per step 1.
   d. If CCCH block 114 reading is unsuccessful, then the mobile station 106 goes to sleep and schedules its next wakeup in the next DRX cycle but will wake up ahead of time (i.e., according to the long sync up procedure) to perform initial cell search (e.g., which may take about 2 to 5 sec), as typically executed after the mobile station 106 is powered ON. It is to be noted that the mobile station 106 will scan through the frequencies and, according to the measured strongest RSSI, the mobile station 106 will detect FCCH and SCH and perform the proper (i.e., full) cell selection operations. When done, the mobile station 106 schedules the CCCH block 114 reading as per step 2b.
3. If the RSSI is not fulfilling the C1/C2 criteria,
   In some embodiments, the mobile station 106 will try to check the C1, C2 criteria for other neighbor cells listed in the BA (i.e., BCCH allocation) list. The BA list was received by the mobile station 106 in the previous wake up period. If the C1, C2 criteria passes for any of the neighbor cells in the list, then the mobile station 106 will schedule for CCCH reception from that cell. Otherwise, if the C1, C2 criteria fails for all the neighbor cells listed in the BA list, then there is no need to perform CCCH reading. The mobile station 106 will program itself to wake up according to the long DRX period and, at the start of the wake-up, the mobile station 106 is configured to perform the long sync up procedure (i.e., as this time, the CCCH block decoding was unsuccessful). If the C1, C2 criteria passed but the CCCH block 114 decoding failed, and if short DRX is configured (i.e., meaning the network will repeatedly send the CCCH message block 114 over a short while), then the mobile station 106 could try to receive the CCCH message block 114. And if the mobile station 106 is successful in decoding any of the CCCH message blocks 114, which were repeatedly sent by the network in short DRX, then the mobile station 106 will program itself to perform a short sync up in the next wake up. Otherwise, if the mobile station 106 failed in decoding all of the CCCH message blocks 114, then the mobile station 106 will program itself to perform a long sync up after wakeup in the next period from sleep.

As an option, to allow the mobile station 106 to still have a chance to receive a page 114, the $BSS\ 104_1$ might have sent using its nominal long DRX block for the case of first paging block reception failure (step 2d). The SGSN 102 (i.e., core network node 102), the BSS 104₁, and the mobile station 106 could proceed as follows, as illustrated in FIG. 8B:

1. The SGSN 102 would, after not receiving a response 115 to the page 114 determined by the long DRX cycle, trigger the sending up to 'N' repeats of the initial page 114 according to the short DRX mode (e.g., wherein N can have a default value such as 2, or be sent as part of System Information on the BCCH of the new serving cell). FIG. 8B illustrates the repetition of paging 114 according to the short DRX cycle immediately (e.g., without delay) following a page 114 according to the long DRX cycle. The repetition should be sufficiently delayed to allow the mobile station 106 to, if needed, find a new suitable cell to camp on according to the initial cell search (e.g., which may take about 2 to 5 sec).
2. The BSS 104₁ would, upon receiving the 'N' repeats of the initial page 114 from the SGSN 102, page the mobile station 106 on paging blocks 114 according to the short DRX mode.
3. The mobile station 106 would, upon detecting first paging block reception failure (step 2d), immediately (e.g., without delay) perform initial cell search, or follow the procedure in step 3, and upon finding a suitable cell, schedule the reading of up to 'N' paging blocks 114 determined according to its short DRX mode (i.e., legacy DRX mode).
4. After successfully reading the CCCH block 114 and finding a matching page, the mobile station 106 will act as per legacy procedures. If no page is found, the mobile station 106 will switch back to long DRX mode, go to sleep again after scheduling its next wakeup in the next DRX cycle according to the short sync up procedure, and then proceed as per step 1 (i.e., tune to the RF frequency of the last used serving cell and measure RSSI).

This option may be of importance for the case where payload delivery, though not time-critical in general, should still be performed within the time period spanned by a long DRX cycle, as this may be part of the contracted quality of service for a given MTC application.

If during the long DRX cycle, the mobile station 106 needs to transmit something in the uplink (e.g., on reception of data from the application layer), the RR layer follows the procedures described in steps 1, 2 and 3 to synchronize to the cell. When synchronized, the mobile station 106 follows legacy procedures.

As described above, there will be two possible paging configurations (i.e., long and short DRX) that can be used for paging management within the scope of the mobile station 106 nominally operating according to long DRX mode. There could be several different options for how to realize a paging repetition for the case where the mobile station 106 is unable to read its nominal paging block while in a long DRX configuration. One such example option related to dynamic conversion between long DRX paging configuration and short DRX paging configuration while operating in long DRX mode is described above with respect to FIG. 8B.

Another notable aspect is that the SGSN 102 has no idea of when in time the nominal paging group occurs, as it is only the BSS 104₁ that has detailed knowledge of when the nominal paging group occurs in the time domain for any given mobile station 106. Moreover, if the nominal paging group is far into the future (e.g., tens of minutes to hours or days), the BSS 104₁ may not be able to store the page 114 until the nominal paging groups occur. Because it is the responsibility of the SGSN 102 to handle repetition of paging 114, there may be a need for the BSS 104₁ to notify the SGSN 102 when the nominal paging group occurs. This could be solved, for example, by the BSS 104₁ rejecting the page from the SGSN 102 if the mobile station's paging group is far away, and subsequently indicating that the SGSN 102 is to re-page after X min or hours.

Yet another notable aspect, when using long DRX cycles, is that the page 114 may be discarded due to paging congestion in the BSS 104₁ at the time of delivery. It could therefore be beneficial to signal paging congestion on the paging channel to allow the mobile station 106 in long DRX mode to temporarily, e.g., switch to short DRX mode and thereby increase the paging success rate. This could be achieved, for example, by reusing the extended paging page mode feature or by introducing a new flag.

It is to be noted that after successful reception of a CCCH message 114, the mobile station 106 will perform similar operations, like BCCH reading for System Information, etc., as per legacy procedure, to be cognitive about the scenarios like, paging reorganization, etc.

The aforementioned embodiment brings several advantages as discussed next. For example, if the DRX cycle of legacy is 15 sec (e.g., split paging cycles on CCCH) and the new long DRX cycle is 1000 minutes and the observation period for battery energy saving is, for example, three days (e.g., assumed to be a typical battery back-up time), it is found that the energy saving ratio (i.e., gain in the power consumed in legacy idle mode operations compared to the new disclosed technique) will be more than 3000 times. With these assumptions and assuming no uplink or downlink data transfer, a legacy stationary device battery lasting three days can now last roughly 27 years (e.g., based on theoretical computation) using the new disclosed technique, given no other limitations in life time and that no other power consuming activities are performed (i.e., which is assumed for comparison purposes). The detailed computation is provided in the following TABLES #2-5.

TABLE #2

DRX and observation period.

| Period | Time |
| --- | --- |
| DRX Cycle Legacy | 15 sec |
| DRX Cycle New | 1000 min |
| Observation Period | 3 days = 4320 min |

TABLE #3

Power consumption figures for different procedures.

| Procedure | Power consumption [µJ] |
| --- | --- |
| CCCH | 400 |
| BSIC Reading | 200 |
| BCCH Reading | 600 |
| RSSI | 1000 |
| Short Sync | 30 |
| Full Sync, full FCH read | 10000 |

TABLE #4

Occurrences of different procedures during observation period.

|  | CCCH reading | BSIC reading | BA reading | RSSI | Short Sync | Long Sync |
|---|---|---|---|---|---|---|
| Legacy | 17280 | 8640 | 8640 | 51840 | — | — |
| New | 4.32 | 0 | 0 | 0 | 2.59[1] | 1.73[1] |

NOTE[1]:
Probability of 1$^{st}$ CCCH fail is assumed to be 40%

TABLE #5

Total power consumption.

| Power Consumption (μJ) Legacy | 578880000 |
|---|---|
| Power Consumption (μJ) New | 175824 |
| Power Saving Ratio (Legacy/New) | 3292 |

It should be noted that, using this new technique, the power saving gain is achieved due to two factors:

Gain due to long DRX setting
    The use of a longer DRX cycle is, alone, a substantial part of the power savings gain realized. The longer the DRX cycle, the better the power saving.

Gain due to activity reduction at wakeup time.
    An additional substantial power savings is realized during the wakeup phase in long DRX mode, since the activity duration is much shorter (i.e., due to fewer tasks performed during the short synchronizing procedure) than the activity duration associated with the wakeup phase of legacy DRX mode operation. This is illustrated in FIG. 8C.

Scenarios like high mobility (e.g., the mobile station 106 moved to a different cell while in long DRX sleep), downlink signaling failure, SIM not present (e.g., emergency behavior), etc., will lead to a high incidence of the long sync up procedure. In that situation, power saving gains will still be achieved due to the first factor (i.e., the idle phase of long DRX mode). However, scenarios that lead to a high incidence of the long sync up procedure may have to be coupled with the use of paging repetition while in long DRX mode (e.g., the option of dynamic conversion between long DRX and short DRX while operating in long DRX mode as described above) in order to ensure that the mobile station 106 does not experience extended periods during which the mobile station 106 will miss the pages 114. It should be noted that in normal scenarios, only the short sync up procedure is needed, since the serving cell's signal strength does not change frequently in normal operation, and a large number of the devices 106 expected to benefit from the power savings techniques described herein will be stationary.

In GERAN, 'completely switching off the device' has been discussed. However, using the long DRX mode as described next has the following advantages over completely switching off the device 106 while idle.

After every power on, the mobile station 106 performs the downloading of code, data sections from primary memory to on-chip memory, downloads and initializes operating system tasks, etc., which consumes a lot of power (e.g., nearly 100 times of a long sync up procedure). In contrast, if the mobile station 106 is placed in sleep mode by cutting the clocks for a long time, those initial power-on tasks can be avoided, which leads to power saving.

The mobile station 106 can access the network without any delay.

More flexibility is provided and more use cases are potentially covered.

More power saving advantages are provided, as short sync up helps to achieve the quick power saving benefits over long sync up. For example, the long sync up to short sync up power consumption ratio is: 40:1.

In summary, the foregoing description analyzes the scope of the wake-up phase tasks and describes modifications which enable remarkable power savings for the mobile station 106 in conjunction with long DRX cycle (i.e., both the idle phase and wakeup phase of long DRX mode together provide desired power savings). The modifications are mainly in the direction of executing the sync up portion of the wakeup phase tasks on an as-needed basis instead of a periodic basis. Here, the sync up portion and the post sync portion of the wakeup phase tasks together comprise the "Activity Period". Given the considerable power savings and that the effort to implement these disclosed techniques (e.g., as only software upgrades) in the BSS 104$_1$ and the mobile station 106 is low, it is beneficial to pursue both of these new techniques.

The following is a detailed discussion about the existing sync up procedure, the short sync up procedure, and the long sync up procedure that have been described herein with respect to the different embodiments of the present invention.

Existing Sync Up Procedure

After "power on," the traditional mobile station performs initial cell selection, and after camping on a suitable serving cell, the traditional mobile station performs periodic cell re-selection tasks in idle mode as described below:

(1) Initial Cell Selection:
    The traditional mobile station measures the RSSI of all the carriers (as per supported frequency band) and orders these carriers according to their measured signal strength.
    The traditional mobile station tunes to different carriers according to their signal strength, starting from the strongest carrier, and searches for the FCCH. If detected, then the traditional mobile station finds the slot boundary and estimates and corrects the frequency error, unless the tradition mobile station tunes to the next strongest one in the list and searches for the FCCH.
    Once the FCCH is detected and the frequency is corrected, the traditional mobile station searches for the SCH to know the BSIC number and the TDMA frame number of the detected cell.
    Next, the traditional mobile station reads the BCCH to get System Information from the detected cell and, if that cell is allowed, that cell is selected to camp on.

(2) Periodic Cell Reselection Tasks in Idle Mode:
    After camping on a suitable cell, the traditional mobile station periodically wakes up to read the paging message (i.e., PCH on CCCH) to know about any incoming page messages, and also performs neighbor measurement-related tasks for cell re-selection process to ensure that the traditional mobile station remains camped on a best suitable cell. In general, as defined in 3GPP TS 45.008 V9.0.0 (2009-09) clause 6, the traditional mobile station periodically performs the following processing overhead steps while in idle mode (i.e., once the traditional mobile station has camped on to a suitable serving cell), in addition to monitoring its own paging group on the paging channel:
    i. Read BCCH information for BA list: the traditional mobile station reads the BCCH to get a neighbor cell list.
    ii. Make periodic RSSI Measurements for the neighbor cells identified using step (i).

iii. Identify BSIC by reading the FCCH and SCH of the cells in the neighbor cell list to identify the cell-ID. If a new cell is found, add the new cell to the cell database for periodic monitoring.

iv. BSIC reconfirmation: Re-confirms the cell-ID of the already-detected cells by reading the SCH.

v. Cell reselection: Periodic neighbor cell measurements confirm current cells, and identify a better cell. Read the BCCH and camp on a best detected neighbor cell.

vi. LA/RA update: perform NAS procedures for updating the LA and RA, as needed.

vii. Frequency and time synchronization: perform the frequency and time correction of the local clock and counter.

All these periodic cell re-selection tasks put a significant burden on the traditional mobile station in idle mode that leads to significant power consumption just to keep the device synchronized with the network for receiving paging messages in a time-critical manner (i.e., to ensure small paging delays).

Short Sync Up Procedure

Most of the time during the cell reselection process, the mobile station 106 will find the presently-camped cell as the best suitable cell, and this is especially true when the mobile station 106 is stationary or close to stationary. In such case, instead of performing all the above-mentioned periodic cell re-selection tasks, the mobile station 106 can employ a faster version of synchronization and cell-reselection process, which is referred to herein as the short sync up procedure (i.e., first synchronizing procedure).

As a GSM system is a TDMA and FDMA-based system, time and frequency synchronizations are needed for proper transmission and reception of the signal. During the sleep period of its DRX cycle, the mobile station 106 does not transmit or receive any bursts. Thus, the mobile station 106's local time (counter) and frequency base gradually drifts over time. As such, upon waking up to perform the short sync, the mobile station 106 should estimate and correct that error (as best as possible) before starting the communication (e.g., reading a page or performing an uplink transmission). Accordingly, the mobile station 106 will wake up a few slots (e.g., 'N' slots) ahead of the scheduled paging block 114 reception start time according to its nominal DRX cycle (i.e., the short sync up interval or first DRX mode). This short sync up interval (e.g., N*577 µs) could be dynamically computed by the mobile station 106 based on the DRX cycle start time, and the expected FB, SB, NB's appearance within the TDMA frame structure of the presently-camped cell broadcast frequency shortly before the actual start of its next DRX cycle. The mobile station 106 knows (e.g., can determine) the maximum drift of the local oscillator over time, so that the mobile station 106 can predict and estimate the coarse value of the frequency offset occurring over the DRX cycle.

(1) Based on the knowledge of burst types expected within the short sync up interval and the known frequency drift, the mobile station 106 might have to wake up (e.g., single or multiple times based on the parameters mentioned in the paragraph above) prior to the next nominal DRX cycle to avoid having to do a more extensive synchronizing procedure (e.g., long sync up procedure), due to a too-large frequency offset accumulated over the prolonged sleep period.

(2) At the wake up, the mobile station 106 may apply the pre-estimated frequency offset accumulated during sleep, receive N bursts, and try to correct any remaining frequency error and time error, as described in the paragraph above.

(3) During the short sync interval, the mobile station 106 also confirms whether the mobile station 106 is receiving the previously-camped cell's signal or not by checking the SB (e.g., if it appears in the set of N bursts) or by checking the training sequence number using a received NB (normal burst) on that cell broadcast frequency, as specified above.

(4) During the short sync interval, the mobile station 106 is also receiving the [I,Q] samples from the camped cell frequency and uses them to estimate the RSSI value and, from that, the mobile station 106 also verifies the C1/C2 criteria. These may be done in parallel.

(5) If the C1/C2 criterion is fulfilled, the cell is confirmed via a normal burst's TSC number and the needed frequency and time synchronization is performed, and the mobile station 106 will schedule the CCCH reading (i.e., the mobile station 106 schedules the reading of its paging block 114 determined according to its nominal DRX cycle).

Thus, ideally the synchronization, C1/C2 criteria checking, and cell identification are performed within the short sync interval consisting of N bursts (i.e., N*577 µsec before the first burst of the next paging block 114 associated with its nominal DRX paging cycle). The length of this short sync up interval is estimated to vary between 3 to 10 ms.

It should be noted that the last-used serving cell might not be the best cell to stay camped on, but if the mobile station 106 is managing to synchronize with that cell, the expected TSC is confirmed and the C1/C2 criterion is fulfilled, and that cell will be considered as a sufficiently good cell to stay camped on to receive paging messages or to start an uplink RACH transmission. Once a communication link is established (i.e., a TBF is set up), the mobile station 106 might eventually move to the best suitable cell, as per legacy cell re-selection procedure.

Due to mobility, the mobile station 106 might change the cell from time to time. As discussed above, during short sync procedure, the mobile station 106 tries to find out whether the mobile station 106 has changed the cell or still remained in the same cell. For that, the mobile station 106 checks the TSC number using a Normal Burst received on the BCCH frequency. During the short sync up procedure, the mobile station 106 receives several normal bursts and may also receive a synchronization burst (SB). The mobile station 106 could confirm the presently-tuned cell as the previously camped cell by matching the training sequence number in NB (e.g., in slot#0 of the TDMA frame structure) or by reading the SB. In addition to that, if the C1/C2 criterion also matches for that tuned cell, then this further confirms that the mobile station 106 is still in the previously-camped cell, and the signal strength of that cell is still good enough to be camped to monitor the CCCH or to do a Routing Area Update (RAU).

The mobile station 106 could, over time, get an understanding of its mobility or rate of mobility. If any of steps (1)-(5) performed during the short sync procedure fails, then the long sync up procedure and, whenever necessary, also a Routing Area Update will be performed. Hence, depending on the mobility expected, it could be advisable for the mobile station 106 to wake up sufficiently long before the start of its next nominal DRX cycle to allow for both a short sync (that might fail) and a subsequent long sync procedure and Routing Area Update to be performed. If the short sync up procedure is successful, then the mobile station 106 would go back to sleep for the remaining time of the DRX cycle. Otherwise, the mobile station 106 could also perform one or several intermediate short sync ups in the long DRX period, as mentioned in steps (1) to (3).

Long Sync Up Procedure

When performing a long sync up procedure (i.e., second synchronizing procedure), the mobile station 106 performs the RSSI scan of all or several carriers (according to prior knowledge) and then searches the FCCH, followed by the SCH, as performed during the initial cell selection task (i.e., legacy procedure), which might take around 2 to 5 sec. In the short sync up procedure as well as in the long sync up procedure, the mobile station 106 has to wake up in advance to perform the short or long sync procedure for achieving the needed synchronization so that the mobile station 106 can read its paging block 114 according to its next nominal DRX paging cycle. Even if synchronization is performed in time to read its paging block 114, there is a possibility that the mobile station 106 might fail to receive a valid CCCH block 114 therein for both the cases, and in such case, the mobile station 106 has to try in the next paging cycle, or there could be some mechanism for repeated "N" paging over a short period, as described herein.

It should be noted that using the short sync up procedure or the long sync up procedure is not strictly related to using a longer DRX cycle (as it has earlier been described herein) but could also apply to, for example, power saving mode, as specified in 3GPP TS 23.682 V12.2.0 Rel-12.

Further, it should be noted that using the short sync up procedure and the long sync up procedure will, to a large extent, be implementation dependent but is seen as an important factor to understand the potential power saving gains possible to achieve with a modified idle mode behavior in GSM.

Finally, the cellular network 100 is shown and described herein as being configured per the GSM standard, but it should be appreciated that the cellular network 100 and other components of the present invention can be configured per UTRA, E-UTRA, or any other radio access technology wherein the reachability of wireless devices 106 therein has historically been based on the assumption that all deliveries of downlink packet data payload require a rather low latency in the area of a few seconds. Finally, it should be appreciated that the present invention is not limited to mobile station 106's that are characterized as MTC devices but could be any type of mobile station, if desired.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

What is claimed is:

1. A mobile station configured to implement paging cycles in a cellular network, the mobile station comprising:
   at least one processor; and,
   at least one memory that stores processor-executable instructions, wherein the at least one processor interfaces with the at least one memory to execute the processor-executable instructions, whereby said mobile station is operable to:
      determine whether a serving cell in the cellular network is acceptable to stay camped-on;
      based on a result of the determination that the serving cell is acceptable to stay camped-on, perform a first type of synchronizing procedure and attempt to read a radio block received per a first Discontinuous Reception (DRX) mode, wherein the first DRX mode has a longer time period than a legacy second DRX mode;
      based on a result of the determination that the serving cell is not acceptable to stay camped-on or the mobile station is not able to read the received radio block, perform a second type of synchronizing procedure and attempt to read another radio block, wherein the first type of synchronizing procedure has a shorter duration than the second type of synchronizing procedure;
      after performing the first type of synchronizing procedure, attempt to read the radio block received per the first DRX mode only when the mobile station successfully performed the first type of synchronizing procedure; and
      further perform the second type of synchronizing procedure when the mobile station did not successfully perform the first type of synchronizing procedure.

2. A mobile station configured to implement paging cycles in a cellular network, the mobile station comprising:
   at least one processor; and,
   at least one memory that stores processor-executable instructions, wherein the at least one processor interfaces with the at least one memory to execute the processor-executable instructions, whereby said mobile station is operable to:
      determine whether a serving cell in the cellular network is acceptable to stay camped-on, including:
         waking up a predetermined first time before a start time of a paging cycle based on the first DRX mode;
         tuning to a radio frequency of a beacon channel of the serving cell and measuring a Received Signal Strength Indicator (RSSI) of the beacon channel of the serving cell; and
         comparing the RSSI to a threshold value equal to C1/C2, wherein C1 is a path loss criterion parameter for cell selection and C2 is a path loss criterion parameter for cell reselection, and wherein the result of the determination is that the serving cell is acceptable to stay camped-on when the RSSI is greater than the threshold value, and the result of the determination is that the serving cell is not acceptable to stay camped-on when the RSSI is less than the threshold value;
      based on a result of the determination that the serving cell is acceptable to stay camped-on, perform a first type of synchronizing procedure and attempt to read a radio block received per a first Discontinuous Reception (DRX) mode, wherein the first DRX mode has a longer time period than a legacy second DRX mode; and,
      based on a result of the determination that the serving cell is not acceptable to stay camped-on or the mobile station is not able to read the received radio block, perform a second type of synchronizing procedure and attempt to read another radio block, wherein the first type of synchronizing procedure has a shorter duration than the second type of synchronizing procedure.

3. The mobile station of claim 2, wherein comparing the RSSI to the threshold value and performing at least a portion of the first type of synchronizing procedure are performed in parallel.

4. The mobile station of claim 2, wherein when the RSSI is less than or equal to the C1/C2, prior to performing the second synchronizing procedure, (1) measure RSSI for one or more neighbor cells identified by a last received BCCH Allocation (BA) list; (2) when the RSSI on a neighbor cell is greater than the C1/C2, attempt to read a radio block thereon; (3) when the mobile station is able to read the received radio block: (a) act on content of the received radio block, (b) schedule a next wake-up time based on the first DRX mode to perform the determine operation, and (c) enter sleep mode; and (4) when the mobile station is not able to read the received radio block, schedule readings of up to N radio blocks to be received per the legacy second DRX mode, wherein N>1;

when one of the N radio blocks is successfully read, (1) act on content thereof, (2) schedule a next wake-up time based on the first DRX mode to perform the determine operation, and (3) enter sleep mode; and when none of the N radio blocks is successfully read, (1) schedule a next wake-up time based on the first DRX mode to perform the second type of synchronizing procedure, and (2) enter sleep mode.

5. The mobile station of claim 2, wherein when the RSSI is greater than the C1/C2 but the mobile station is not able to read the received radio block, prior to performing the second synchronizing procedure, schedule readings of up to N radio blocks to be received per the legacy second DRX mode, wherein N>1;

when one of the N radio blocks is successfully read), (1) act on the content thereof, (2) schedule a next wake-up time based on the first DRX mode to perform the determine operation, and (3) enter sleep mode; and when none of the N radio blocks is successfully read, (1) schedule a next wake-up time based on the first DRX mode to perform the second type of synchronizing procedure, and (2) enter sleep mode.

6. The mobile station of claim 2, wherein the mobile station being operable to perform the first type of synchronizing procedure comprises the mobile station being operable to:

read a predetermined number of bursts from a received beacon channel of the serving cell;

search for a Training Sequence Code (TSC) in the read bursts to confirm cell identification of the serving cell;

perform Automatic Frequency Control (AFC) operations and Automatic Time Control (ATC) operations; and schedule for reception of the radio block.

7. A method in a mobile station for implementing paging cycles in a cellular network, the method comprising:

determining whether a serving cell in the cellular network is acceptable to stay camped-on;

based on a result of the determination that the serving cell is acceptable to stay camped-on, performing a first type of synchronizing procedure and attempting to read a radio block received per a first Discontinuous Reception (DRX) mode, wherein the first DRX mode has a longer time period than a legacy second DRX mode; and, based on a result of the determination that the serving cell is not acceptable to stay camped-on or the mobile station is not able to read the received radio block, performing a second type of synchronizing procedure and attempting to read another radio block, wherein the first type of synchronizing procedure has a shorter duration than the second type of synchronizing procedure;

after performing the first type of synchronizing procedure, attempting to read the radio block received per the first DRX mode only when the first type of synchronizing procedure is successfully performed; and further performing the second type of synchronizing procedure when the first type of synchronizing procedure is not successfully performed.

8. A method in a mobile station for implementing paging cycles in a cellular network, the method comprising:

determining whether a serving cell in the cellular network is acceptable to stay camped-on, including:

waking-up a predetermined first time before a start time of a paging cycle based on the first DRX mode;

tuning to a radio frequency of a beacon channel of the serving cell and measuring a Received Signal Strength Indicator (RSSI) of the beacon channel of the serving cell; and comparing the RSSI to a threshold value equal to C1/C2, wherein C1 is a path loss criterion parameter for cell selection and C2 is a path loss criterion parameter for cell re-selection, and wherein the result of the determination is that the serving cell is acceptable to stay camped-on when the RSSI is greater than the threshold value, and the result of the determination is that the serving cell is not acceptable to stay camped-on when the RSSI is less than the threshold value;

based on a result of the determination that the serving cell is acceptable to stay camped-on, performing a first type of synchronizing procedure and attempting to read a radio block received per a first Discontinuous Reception (DRX) mode, wherein the first DRX mode has a longer time period than a legacy second DRX mode; and, based on a result of the determination that the serving cell is not acceptable to stay camped-on or the mobile station is not able to read the received radio block, performing a second type of synchronizing procedure and attempting to read another radio block, wherein the first type of synchronizing procedure has a shorter duration than the second type of synchronizing procedure.

9. The method of claim 8, wherein comparing the RSSI to the threshold value and performing at least a portion of the first type of synchronizing procedure are performed in parallel.

10. The method of claim 8, wherein when the RSSI is less than or equal to the C1/C2, prior to performing the second synchronizing procedure, the method further comprises (1) measuring RSSI for one or more neighbor cells identified by a last received BCCH Allocation (BA) list; (2) when the RSSI on a neighbor cell is greater than the C1/C2, attempting to read a radio block thereon; (3) when the received radio block is read: (a) acting on content of the received radio block, (b) scheduling a next wake-up time based on the first DRX mode to perform the determining operation, and (c) entering sleep mode; and (4) when the received radio block is not read, then (a) scheduling readings of up to N radio blocks to be received per the legacy second DRX mode, wherein N>1;

when one of the N radio blocks is successfully read, (1) acting on content thereof, (2) scheduling a next wake-up time based on the first DRX mode to perform the determining operation, and (3) entering sleep mode; and when none of the N radio blocks is successfully read), (1) scheduling a next wake-up time based on the first DRX mode to perform the second type of synchronizing procedure, and (2) entering sleep mode.

11. The method of claim 8, wherein when the RSSI is greater than the C1/C2 but the received radio block is not read, the method further comprises, prior to performing the second synchronizing procedure, scheduling readings of up to N radio blocks to be received per the legacy second DRX mode, wherein N>1;

when one of the N radio blocks is successfully read, the method further comprises (1) acting on the content thereof, (2) scheduling a next wake-up time based on the first DRX mode to perform the determining operation, and (3) entering sleep mode; and when none of the N radio blocks is successfully read, the method further comprises (1) scheduling a next wake-up time based on the first DRX mode to perform the second type of synchronizing procedure, and (2) entering sleep mode.

12. The method of claim 8, wherein the first type of synchronizing procedure comprises:
- reading a predetermined number of bursts from a received beacon channel of the serving cell;
- searching for a Training Sequence Code (TSC) in the read bursts to confirm cell identification of the serving cell;
- performing Automatic Frequency Control (AFC) operations and Automatic Time Control (ATC) operations; and
- scheduling for reception of the radio block.

* * * * *